(12) United States Patent
Choi et al.

(10) Patent No.: US 10,606,908 B2
(45) Date of Patent: Mar. 31, 2020

(54) SYSTEMS AND METHODS TO MANAGE MEDIA CONTENT ITEMS

(71) Applicant: Facebook, Inc., Menlo Park, CA (US)

(72) Inventors: Christine Choi, San Francisco, CA (US); Nathan Andrew Sharp, San Francisco, CA (US); William Samuel Bailey, San Francisco, CA (US); Ashoke K. Chakrabarti, Oakland, CA (US); Joshua Barton Dickens, Oakland, CA (US); Joy-Vincent Niemantsverdriet, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 152 days.

(21) Appl. No.: 15/421,413

(22) Filed: Jan. 31, 2017

(65) Prior Publication Data
US 2018/0032619 A1    Feb. 1, 2018

Related U.S. Application Data

(60) Provisional application No. 62/369,632, filed on Aug. 1, 2016.

(51) Int. Cl.
*G06F 7/02* (2006.01)
*G06F 16/00* (2019.01)
(Continued)

(52) U.S. Cl.
CPC ........ *G06F 16/9535* (2019.01); *G06F 3/0481* (2013.01); *G06F 3/04817* (2013.01); *G06F 3/04842* (2013.01); *G06F 3/04883* (2013.01); *G06F 16/438* (2019.01); *G06F 16/48* (2019.01); *G06F 16/9038* (2019.01); *G06Q 50/01* (2013.01); *H04L 51/12* (2013.01); *H04L 51/32* (2013.01); *H04L 63/10* (2013.01);
(Continued)

(58) Field of Classification Search
CPC ............ G06F 17/30867; G06F 3/0482; G06F 3/04842; G06F 3/04883; G06F 3/0485; G06F 16/9535; G06F 16/9038; G06F 16/48; G06F 16/438; G06Q 50/01
See application file for complete search history.

(56) References Cited

U.S. PATENT DOCUMENTS 6,711,608 B1    3/2004   Ogilvie
7,149,893 B1   12/2006   Leonard
(Continued)

FOREIGN PATENT DOCUMENTS

KR    1020160078111    7/2016

OTHER PUBLICATIONS

International Application No. PCT/US2017/016572, International Search Report and Written Opinion dated Apr. 28, 2017.
(Continued)

*Primary Examiner* — Bruce M Moser
(74) *Attorney, Agent, or Firm* — Sheppard Mullin Richter & Hampton LLP

(57) ABSTRACT

Systems, methods, and non-transitory computer readable media are configured to provide a first element in an interface presentable to a user through which a plurality of ephemeral media content items are accessible by the user for a selected period of time. A second element in the interface through which a plurality of non-ephemeral media content items are accessible by the user is provided.

14 Claims, 21 Drawing Sheets

(51) Int. Cl.

| | |
|---|---|
| *G06F 16/9535* | (2019.01) |
| *G06F 16/48* | (2019.01) |
| *G06F 16/438* | (2019.01) |
| *G06F 16/9038* | (2019.01) |
| *G06Q 50/00* | (2012.01) |
| *G06F 3/0488* | (2013.01) |
| *H04L 12/58* | (2006.01) |
| *H04L 29/06* | (2006.01) |
| *G06F 3/0481* | (2013.01) |
| *G06F 3/0484* | (2013.01) |
| *G06F 3/0482* | (2013.01) |

(52) U.S. Cl.
CPC .......... *H04L 63/102* (2013.01); *G06F 3/0482* (2013.01); *G06F 3/0488* (2013.01); *G06F 3/04845* (2013.01)

(56) References Cited

U.S. PATENT DOCUMENTS

| | | | |
|---|---|---|---|
| 8,898,133 B2 | 11/2014 | Silberstein | |
| 9,110,953 B2 | 8/2015 | Steinberg | |
| 9,824,477 B1 | 11/2017 | McDonald | |
| 10,134,095 B2 | 11/2018 | Kennon | |
| 2003/0038474 A1 | 2/2003 | Maxted | |
| 2007/0088832 A1 | 4/2007 | Tsang | |
| 2007/0100960 A1 | 5/2007 | Eichstaedt | |
| 2008/0288499 A1 | 11/2008 | Choi | |
| 2009/0276709 A1 | 11/2009 | Venneman | |
| 2010/0185665 A1* | 7/2010 | Horn ..................... | G06Q 10/107 707/769 |
| 2012/0278387 A1 | 11/2012 | Garcia | |
| 2013/0103667 A1 | 4/2013 | Minh | |
| 2013/0141463 A1 | 6/2013 | Barnett | |
| 2014/0067833 A1 | 3/2014 | Nandi | |
| 2014/0068549 A1 | 3/2014 | Friedman | |
| 2014/0156763 A1 | 6/2014 | Dubetz | |
| 2014/0201142 A1* | 7/2014 | Varadharajan .......... | G06F 16/23 707/622 |
| 2014/0280537 A1 | 9/2014 | Pridmore | |
| 2014/0282096 A1 | 9/2014 | Rubinstein | |
| 2014/0282745 A1 | 9/2014 | Chipman | |
| 2014/0372948 A1* | 12/2014 | Shaw .................... | G06F 3/0482 715/817 |
| 2015/0020096 A1 | 1/2015 | Walker | |
| 2015/0033132 A1 | 1/2015 | Zhang | |
| 2015/0052456 A1 | 2/2015 | Engelking | |
| 2015/0163189 A1 | 6/2015 | Proctor | |
| 2015/0200999 A1 | 7/2015 | Chen | |
| 2015/0256565 A1 | 9/2015 | Skinner | |
| 2015/0332062 A1* | 11/2015 | McReynolds ........... | H04L 51/28 726/28 |
| 2015/0365795 A1 | 12/2015 | Allen | |
| 2015/0371613 A1* | 12/2015 | Patel ....................... | G06F 21/10 345/549 |
| 2016/0063224 A1* | 3/2016 | Raley .................... | G06F 21/105 726/29 |
| 2016/0063277 A1 | 3/2016 | Vu | |
| 2016/0078035 A1 | 3/2016 | Ball | |
| 2016/0085773 A1 | 3/2016 | Chang | |
| 2016/0099901 A1 | 4/2016 | Allen | |
| 2016/0103563 A1 | 4/2016 | Greenberg | |
| 2016/0149843 A1 | 5/2016 | Spicer | |
| 2016/0156874 A1 | 6/2016 | Rajagopalan | |
| 2016/0182422 A1 | 6/2016 | Sehn | |
| 2016/0255082 A1 | 9/2016 | Rathod | |
| 2016/0283099 A1 | 9/2016 | DeFusco | |
| 2016/0323219 A1 | 11/2016 | Brecx | |
| 2016/0328360 A1 | 11/2016 | Pavlovskaia | |
| 2017/0019446 A1 | 1/2017 | Son | |
| 2017/0034173 A1 | 2/2017 | Miller | |
| 2017/0068649 A1 | 3/2017 | Staunovo Polacco | |
| 2017/0099253 A1 | 4/2017 | Muthukumar | |
| 2017/0126592 A1* | 5/2017 | El Ghoul ................ | H04L 51/04 |
| 2017/0149789 A1 | 5/2017 | Flynn, III | |
| 2017/0228114 A1 | 8/2017 | Brett | |
| 2017/0249306 A1 | 8/2017 | Allen | |
| 2017/0289234 A1* | 10/2017 | Andreou ............. | G06F 3/04845 |
| 2017/0293891 A1 | 10/2017 | Rathod | |
| 2017/0300782 A1 | 10/2017 | Cai | |
| 2017/0372364 A1 | 12/2017 | Andreou | |
| 2018/0351903 A1* | 12/2018 | Allen ..................... | G06Q 10/10 |
| 2019/0005419 A1* | 1/2019 | Howard ............. | G06Q 30/0241 |

OTHER PUBLICATIONS

Rouse, Margaret, "Ephemeral Messaging," SearchCIO.com, Mar. 2, 2016 [retrieved from https://searchcio.techtarget.com/definition/ephemeral-messaging?vgnextfmt=print on Nov. 19, 2018].

\* cited by examiner

500 

```
┌─────────────────────────────────────────────────────────────────────┐
│ Provide a first element in an interface presentable to a user through which a │
│ plurality of ephemeral media content items are accessible by the user for a   │
│                      selected period of time                         │
│                              502                                     │
└─────────────────────────────────────────────────────────────────────┘
                                  │
                                  ▼
┌─────────────────────────────────────────────────────────────────────┐
│ Provide a second element in the interface through which a plurality of non-   │
│           ephemeral media content items are accessible by the user            │
│                              504                                     │
└─────────────────────────────────────────────────────────────────────┘
```

```
Receive a designation by a content provider that a media content item is an
ephemeral media content item
512
```

```
Provide an identifier of the content provider for potential presentation in a first
element based on the designation
514
```

520

```
┌─────────────────────────────────────────────────────────────────────┐
│ Determine levels of relevance of a plurality of ephemeral media     │
│ content items associated with a plurality of content providers to   │
│ a user based on ranking signals, the plurality of ephemeral media   │
│ content items accessible to the user                                │
│                              522                                    │
└─────────────────────────────────────────────────────────────────────┘
                                   │
                                   ▼
┌─────────────────────────────────────────────────────────────────────┐
│ Determine a ranked ordering of the plurality of ephemeral media     │
│ content items based on the levels of relevance                      │
│                              524                                    │
└─────────────────────────────────────────────────────────────────────┘
                                   │
                                   ▼
┌─────────────────────────────────────────────────────────────────────┐
│ Determine a ranked ordering of the plurality of content providers   │
│ based on the ranked ordering of the plurality of ephemeral media    │
│ content items                                                       │
│                              526                                    │
└─────────────────────────────────────────────────────────────────────┘
                                   │
                                   ▼
┌─────────────────────────────────────────────────────────────────────┐
│ Provide an element in an interface presentable to the user based    │
│ on the ranked ordering of the plurality of content providers        │
│                              528                                    │
└─────────────────────────────────────────────────────────────────────┘
```

```
┌─────────────────────────────────────────────────────────────────┐
│  Provide an element in an interface presentable to a user       │
│  through which a plurality of ephemeral media content items     │
│  are accessible by the user                                     │
│                              532                                │
└─────────────────────────────────────────────────────────────────┘
                                  ▼
┌─────────────────────────────────────────────────────────────────┐
│  Receive a selection of the user from a content provider to     │
│  deny the user access to ephemeral media content items of       │
│  the content provider                                           │
│                              534                                │
└─────────────────────────────────────────────────────────────────┘
                                  ▼
┌─────────────────────────────────────────────────────────────────┐
│  Deny the user access to the ephemeral media content items      │
│  of the content provider                                        │
│                              536                                │
└─────────────────────────────────────────────────────────────────┘
                                  ▼
┌─────────────────────────────────────────────────────────────────┐
│  Not present an identifier of the content provider in the       │
│  element                                                        │
│                              538                                │
└─────────────────────────────────────────────────────────────────┘
```

FIGURE 5D

SYSTEMS AND METHODS TO MANAGE MEDIA CONTENT ITEMS

CROSS-REFERENCE TO RELATED APPLICATIONS

This application claims priority to U.S. Provisional Patent Application No. 62/369,632, filed on Aug. 1, 2016 and entitled "SYSTEMS AND METHODS TO MANAGE MEDIA CONTENT ITEMS", which is incorporated in its entirety herein by reference.

FIELD OF THE INVENTION

The present technology relates to media content items. More particularly, the present technology relates to techniques for managing media content items provided by members of a social networking system.

BACKGROUND

Users often utilize computing devices for a wide variety of purposes. Users can use their computing devices to, for example, interact with one another, access media content, share media content, and create media content. In some cases, media content can be provided by members of a social network. The media content can include one or a combination of text, images, videos, and audio. The media content may be published to the social network for consumption by others.

Under conventional approaches, media content provided by a member of a social network can be included in a profile of the member on the social network. In other instances, media content posted by the member can appear in respective media content feeds of other members of the social network. The other members can be connections of the member who provided the media content.

SUMMARY

Various embodiments of the present technology can include systems, methods, and non-transitory computer readable media configured to provide a first element in an interface presentable to a user through which a plurality of ephemeral media content items are accessible by the user for a selected period of time. A second element in the interface through which a plurality of non-ephemeral media content items are accessible by the user is provided.

In an embodiment, the first element is a listing comprising identifiers of a plurality of content providers associated with the plurality of ephemeral media content items and the second element is a listing comprising the plurality of non-ephemeral media content items.

In an embodiment, a designation by a content provider that a media content item is an ephemeral media content item is received. An identifier of the content provider is provided for potential presentation in the first element based on the designation.

In an embodiment, a designation by a content provider that a media content items is a non-ephemeral media content item is received. The media content item is provided for potential presentation in the second element based on the designation.

In an embodiment, the first element is a first scrollable array comprising identifiers of a plurality of content providers associated with the plurality of ephemeral media content items and the second element is a second scrollable array comprising the plurality of non-ephemeral media content items.

In an embodiment, the first element and the second element are scrollable in different directions.

In an embodiment, a type of one or more ephemeral media content items of the plurality of ephemeral media content items is indicated in the first element.

Various embodiments of the present technology can include systems, methods, and non-transitory computer readable media configured to determine levels of relevance of a plurality of ephemeral media content items associated with a plurality of content providers to a user based on ranking signals, the plurality of ephemeral media content items accessible to the user. A ranked ordering of the plurality of ephemeral media content items is determined based on the levels of relevance. A ranked ordering of the plurality of content providers is determined based on the ranked ordering of the plurality of ephemeral media content items. An element in an interface presentable to the user is provided based on the ranked ordering of the plurality of content providers.

In an embodiment, the ranking signals are based on relationships on a social networking system between the user and the plurality of content providers.

In an embodiment, the ranking signals as between the user and a content provider of the plurality of content providers on a social networking system comprise at least one of: a first signal relating to whether the user has subscribed to notifications about actions taken by the content provider; a second signal relating to a number of likes by the user of media content items of the content provider; and a third signal relating to whether the user and the content provider mutually follow one another.

In an embodiment, the levels of relevance are indicated by a plurality of scores, each score of the plurality of scores based on components associated with the ranking signals.

In an embodiment, one or more of the plurality of ephemeral media content items are accessible for a selected period of time through the element.

In an embodiment, new ephemeral media content items that are accessible to the user are received. A new ranked ordering of the plurality of content providers is determined based on the plurality of ephemeral media content items and the new ephemeral media content items.

In an embodiment, the new ranked ordering of the plurality of content providers is determined after a threshold number of the new ephemeral media content items is accessible to the user.

Various embodiments of the present technology can include systems, methods, and non-transitory computer readable media configured to provide an element in an interface presentable to a user through which a plurality of ephemeral media content items are accessible by the user. A selection of the user is received from a content provider to deny the user access to ephemeral media content items of the content provider. Access to the ephemeral media content items of the content provider is denied to the user. An identifier of the content provider is not presented in the element.

In an embodiment, the content provider is provided a listing of users having access to the ephemeral media content items of the content provider, the listing of users including the user. In response to provision of the listing of users, one or more inputs from the content provider associated with denying the user access to the ephemeral media content items of the content provider are received.

In an embodiment, the listing of users includes users who have previously accessed at least one ephemeral media content item of the content provider.

In an embodiment, the identifier of the content provider is not presented in search results in response to a search performed by the user. The ephemeral media content items and the identifier of the content provider are not presented in an explorer mode in which media content items of potential interest are provided to the user.

In an embodiment, a selection of a second content provider associated with ephemeral media content items about which notifications are not desired is received from the user. An identifier of the second content provider is not presented in the element.

In an embodiment, a selection of a second content provider associated with ephemeral media content items about which notifications are not desired is received from the user. An identifier of the second content provider is removed from the element.

In an embodiment, the user is allowed to provide one or more touch gestures to the interface to drag the identifier of the second content provider out of the element.

Various embodiments of the present technology can include systems, methods, and non-transitory computer readable media configured to generate a container associated with related ephemeral media content items. The container is provided in an element of an interface presentable to a user through which a plurality of ephemeral media content items are accessible by the user. Access by the user to the container is expired. The container is not presented in the element upon expiration of access by the user to the container.

In an embodiment, the container is associated with parameters. Ephemeral media content items are automatically assigned to the container when the ephemeral media content items satisfy the parameters.

In an embodiment, the parameters relate to at least one of time information and location information.

In an embodiment, the assigned ephemeral media content items are captured by a content provider that created the container.

In an embodiment, expiration of access by the user to the container comprises at least one of: expiring access to the container after a selected period of time measured from a time when the container was created; expiring access to an ephemeral media content item associated with the container after a selected period of time measured from a time when the ephemeral media content item was assigned to the container; and expiring access to an ephemeral media content item associated with the container after a selected period of time measured from a time when the ephemeral media content item first became accessible.

In an embodiment, the container is accessible from a profile of a content provider associated with the related ephemeral media content items.

In an embodiment, the container is represented in the element by at least one of an icon, an identifier of the content provider, and an ephemeral media content item associated with the container.

Various embodiments of the present technology can include systems, methods, and non-transitory computer readable media configured to generate a container reflecting collaboration by at least a content provider and a collaborator. A first ephemeral media content item captured by the content provider is assigned to the container. A second ephemeral media content item captured by the collaborator is assigned to the container. The container is provided in an element of an interface presentable to a user through which a plurality of ephemeral media content items are accessible by the user.

In an embodiment, access by the user to the container is expired. The container is not presented in the element upon expiration of access by the user to the container.

In an embodiment, a selection of the collaborator is received from the content provider.

In an embodiment, a selection of a second collaborator is received from the collaborator. A third ephemeral media content item captured by the second collaborator is assigned to the container.

In an embodiment, the collaborator is removed from collaboration relating to the container based on an input from the content provider.

In an embodiment, the collaborator is removed from collaboration relating to the container based on an input from the collaborator.

In an embodiment, the container is represented in the element by at least one of an identifier of the content provider, an identifier of the collaborator, and a thumbnail of an ephemeral media content item assigned to the container.

Various embodiments of the present technology can include systems, methods, and non-transitory computer readable media configured to provide an ephemeral media content item of a content provider to a user. It is determined whether the content provider is a follower of the user on a social networking system. The follower is permitted to send a direct message to the content provider on the social networking system based on a determination that the content provider is a follower of the user.

In an embodiment, determination of whether the content provider is a follower of the user comprises determining that the content provider is a follower of the user.

In an embodiment, determination of whether the content provider is a follower of the user comprises determining that the content provider is not a follower of the user.

In an embodiment, the follower is prevented from sending a direct message to the content provider on the social networking system.

In an embodiment, an input relating to a swipe from the user to an interface through which the ephemeral media content item is presented is received. An inbox of the user is presented in response to receipt of the input.

In an embodiment, an input relating to a swipe from the content provider to an interface through which the ephemeral media content item is presented is received. An inbox of the content provider is presented in response to receipt of the input.

In an embodiment, whether the content provider is a follower of the user on the social networking system is a condition associated with an option selectable by the content provider to control direct messages to the content provider.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5A illustrates an example method for managing access to media content items through a first element and a second element, according to an embodiment of the present technology.

FIG. 5C illustrates an example method for ranking ephemeral media content items, according to an embodiment of the present technology.

FIG. 5D illustrates an example method for selectively controlling access to media content items through an element, according to an embodiment of the present technology.

Figure 1:
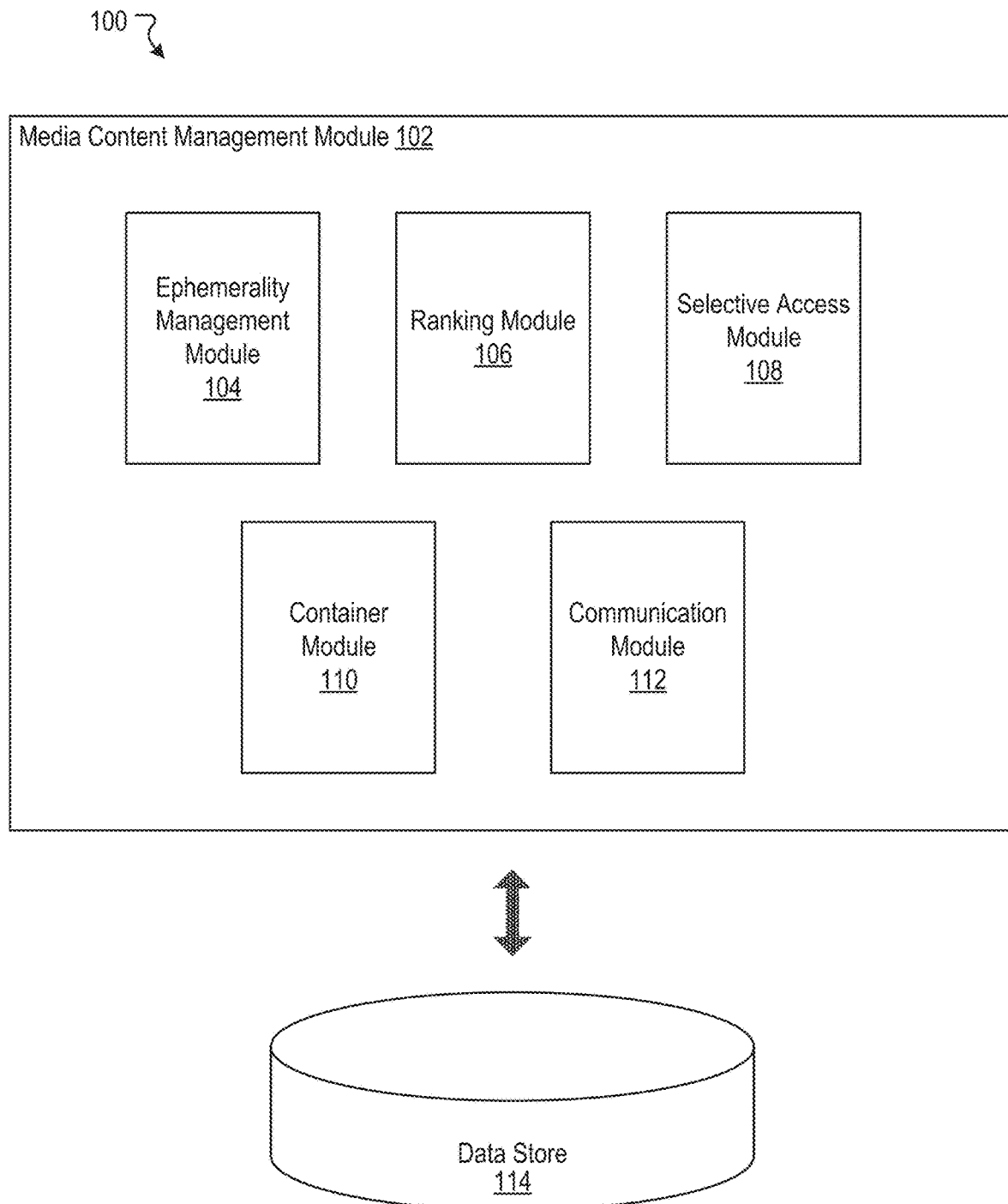
FIG. 1 illustrates a system including an example media content management module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Managing Media Content Items

As mentioned, users often utilize computing devices for a wide variety of purposes. Users can use their computing devices to, for example, interact with one another, access media content, share media content, and create media content. In some cases, media content items can include postings from members of an online community or platform, such as a social network. The postings may include one or a combination of text, images, videos, and audio. The postings may be published to the social network for consumption by others. Under conventional approaches, media content items posted by a member can be included in a profile of the member on the social network. In other instances, media content items posted by the member can appear in respective media content feeds of other users who are members of the social network. The other users can be connections of the member who posted the media content items.

A social network often can confront various challenges in management of media content items provided to the social network. Some challenges can relate to problems associated with user experience of content providers of media content items. Such content providers can include creators of media content items. For example, a content provider can be motivated to create and provide substantial amounts of media content items to the social network. The social network may provide access to the media content items to other users for an indefinite amount of time. However, certain considerations can reflect a desire of the content provider not to share some media content items for such a long time duration. For example, the content provider may believe that some media content items are relevant for only a short time. As another example, the content provider may wish to avoid publication of some media content items for an unduly large amount of time when the media content items are deemed not reflective of an online persona of the content provider or are not consistent with other media content items maintained in a profile of the content provider. On the other hand, the content provider may desire to indefinitely share other media content items when such considerations do not apply. Conventional techniques employed by a social network often cannot accommodate these dual interests of content providers. Accordingly, the user experience of content providers can suffer, discouraging them from sharing media content items on the social network.

An improved approach rooted in computer technology overcomes the foregoing and other disadvantages associated with conventional approaches specifically arising in the realm of computer technology. Systems, methods, and computer readable media of the present technology can allow a content provider to designate certain media content items as ephemeral content items or non-ephemeral media content items. An ephemeral media content item can be accessible on a social networking system to selected users of the social networking system for a temporary period of time. In some instances, a user can access ephemeral media content items and non-ephemeral media content items through a computer interface presented to the user on an associated computing device. Access to the media content items can be distributed over different elements or channels presented in the interface. For example, a first element can provide access to ephemeral media content items and a second element can provide access to non-ephemeral media content items. In some instances, content providers associated with ephemeral media content items can be sorted and ranked based on a variety of ranking signals. A selected number of the content providers in a ranked ordering can be reflected in the first element to allow the user to access their associated ephemeral media content items. In some instances, selective access to ephemeral media content items can be determined by both content providers and users. A content provider can deny access to its ephemeral media content items to selected users. In addition, a user who is provided access to ephemeral media content items of a content provider can choose not to receive notifications about the ephemeral media content items. In some instances, a content provider can create a collection of related ephemeral media content items associated with a container. The content provider can determine a name to the container. After creation of the container, ephemeral media content items that are captured by the content provider can be automatically assigned to the container. When new ephemeral media content items are captured that are not appropriate for the container, the content provider can create a new container for the new ephemeral media content items. In some instances, a content provider who creates a container can invite other content providers to collaboratively assign to the container ephemeral media content items captured by their computing devices. In some instances, a viewer of an ephemeral media content item can directly message a content provider associated with the ephemeral media content item when the user and the content provider have a certain relationship. The functionality of the present technology can be implemented based at least in part on suitable computer interfaces presented to content providers and users. More details regarding the present technology are described herein.

FIG. 1 illustrates an example system 100 including an example media content management module 102 configured to selectively manage and control access to media content items, according to an embodiment of the present technology. Management and control of access to media content items can be performed by a member, such as a content provider or a user, of a social networking system based on appropriate inputs and commands applied to a computer interface presented to the member on a computing device. For example, the computer interface can be provided through a touchscreen of the computing device. The computer interface can be provided by a utility, such as a software application, provided by the social networking system. Media content items to which access can be managed and controlled can include media content items that are ephemeral (or ephemeral media content items) and media content items that are not ephemeral (or non-ephemeral media content items), as described in more detail below. As discussed in more detail herein, the media content management module 102 can manage and control access to media content items based at least in part on their ephemerality.

The media content management module 102 can include an ephemerality management module 104, a ranking module 106, a selective access module 108, a container module 110, and a communication module 112. The ephemerality management module 104 can allow a content provider to designate an associated media content item as an ephemeral media content item or a non-ephemeral media content item. Access by a user to ephemeral media content items and non-ephemeral media content items can be provided through distinct (separate) elements or channels of a computer interface presented on a computing device associated with the user. The interface can be provided by a software application associated with a social networking system. A first element presentable in the interface can provide access to ephemeral media content items while a second element presentable in the interface can provide access to non-ephemeral media content items. Access to ephemeral media content items can be expired (or terminated) after a selected period of time. The ranking module 106 can sort and rank a plurality of content providers associated with ephemeral media content items accessible by a user. A ranked ordering of the content providers can be based on a variety of ranking signals. The ranked ordering of content providers can be reflected in the first element of the interface. The selective access module 108 can allow a content provider to deny access to ephemeral media content items of the content provider to selected users. In addition, the selective access module 108 can allow a user to not receive notifications about ephemeral media content items of selected content providers. The container module 110 can allow a content provider to create a container to which certain ephemeral media content items are automatically assigned. The container module 110 also can allow the content provider to invite other content providers to collaboratively contribute their relevant ephemeral media content items to the container. The communication module 112 can allow a user viewing an ephemeral media content item to initiate direct communication with a content provider associated with the ephemeral media content item when the content provider has a certain relationship with the user. The functionality of the present technology can be implemented based at least in part on suitable computer interfaces presented on computing devices of content providers and users as well as interactions of the content providers and the users with the computer interfaces, such as inputs to the computer interfaces. The media content management module 102 is described in more detail herein.

The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the media content management module 102 can be implemented in any suitable combinations.

Terms appearing herein are used flexibly and should be understood in context. As used herein, "media content items" can include both ephemeral media content items and non-ephemeral media content items. As used herein, an "ephemeral media content item" can refer to a media content item that is accessible to selected users for only a temporary, selected period of time after which access automatically expires for the users. As used herein, a "story" can include one or more related ephemeral media content items. A story can appear in one or more elements of a computer interface, such as feeds of ephemeral media content items presented to various users and a content provider of the story. As used herein, a "non-ephemeral media content item" (or "post") can refer to a media content item to which access does not automatically expire. A non-ephemeral media content item can be "posted" for potential appearance in one or more feeds of non-ephemeral media content items presented to various users and a content provider of the non-ephemeral media content item. Upon posting, a non-ephemeral media content item also can be visible to the content provider and its followers on a profile or archive of the content provider. As used herein, a "content provider" of a media content item can include an entity that provided the media content item to an online service or platform, such as a social networking system, for potential access by others. The content provider can include, for example, a creator (e.g., capturer) of the media content item, an owner of the media content item, or a licensee of the media content item. The context in which a term appears herein should inform the meaning of the term in that context.

In some embodiments, the media content management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the media content management module 102 can be, in part or in whole, implemented as software running on one or more computing devices or systems, such as on a server or a client computing device. For example, the media content management module 102 can be, in part or in whole, implemented within or configured to operate in conjunction or be integrated with a social networking system (or service), such as a social networking system 630 of FIG. 6. As another example, the media content management module 102 can be implemented as or within a dedicated application (e.g., app), a program, or an applet running on a user computing device or client computing system. In some instances, the media content management module 102 can be, in part or in whole, implemented within or configured to operate in conjunction or be integrated with client computing device, such as a user device 610 of FIG. 6. It should be understood that many variations are possible.

The system 100 can include a data store 114 configured to store and maintain various types of data, such as the data relating to support of and operation of the media content management module 102. The data store 114 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the media content management module 102 can be configured to communicate and/or operate with the data store 114.

Figure 2:
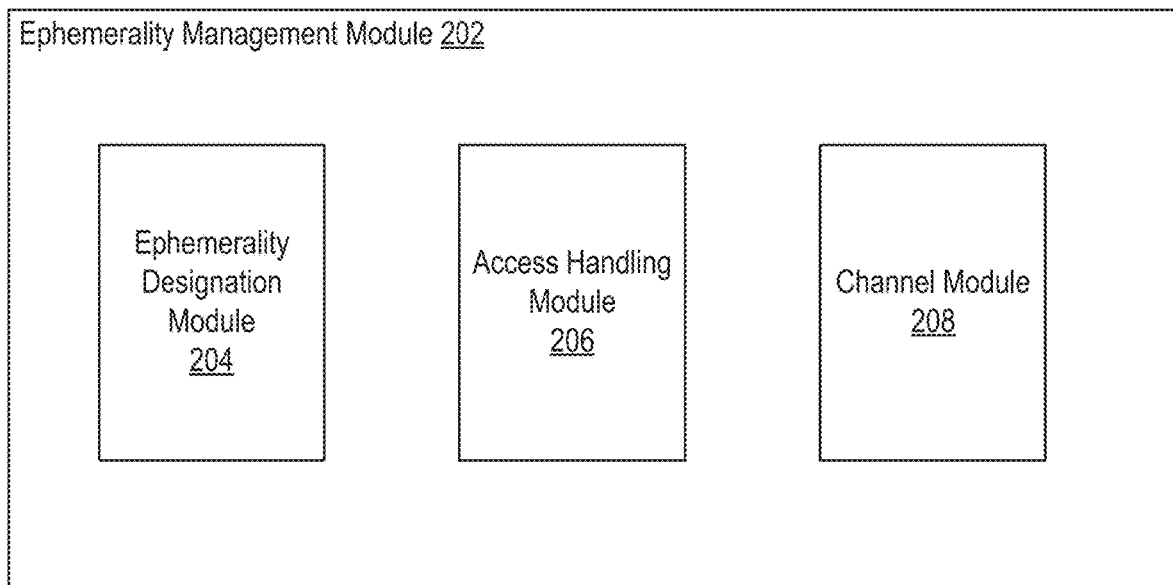
FIG. 2 illustrates an example ephemerality management module, according to an embodiment of the present technology.

FIG. 2 illustrates an example ephemerality management module 202, according to an embodiment of the present technology. In some embodiments, the ephemerality management module 104 of FIG. 1 can be implemented with the ephemerality management module 202. The ephemerality management module 202 can include an ephemerality designation module 204, an access handling module 206, and a channel module 208.

The ephemerality designation module 204 can receive a designation of a media content item as an ephemeral media content item or a non-ephemeral media content item. In some embodiments, a content provider can apply an input or touch gesture to a suitable interface, such as a swipe along the interface, to enter a camera mode for capturing a media content item. In some embodiments, a content provider associated with a media content item can determine whether the media content item is to be managed as an ephemeral media content item or a non-ephemeral media content item.

Ephemeral media content items are media content items to which access automatically expires for selected users after a relatively brief time. Access to an ephemeral media content item by selected users can be maintained for a selected period of time. As discussed in more detail herein, the selected users can be determined at least in part by the content provider. After the selected period of time, access to the ephemeral media content item by the selected users automatically expires. After expiration, the ephemeral media content item is no longer accessible to the selected users. The selected period of time can be any desired time duration, such 24 hours or other time duration (e.g., one week, two weeks, one month, one year, etc.). In some embodiments, the selected period of time can be determined by an administrator of social networking system, the content provider, or both. In some embodiments, the selected period of time can be measured from a time when the media content item is first made accessible to the selected users. In various embodiments, selected periods of time during which ephemeral media content items can be accessed can vary in time duration. For example, access to a first ephemeral media content item can expire after a first selected period of time and a second ephemeral media content item can expire after a second selected period of time different from the first selected period of time. In some embodiments, a particular time duration can be selected as the selected period of time for an ephemeral media content item based on a variety of considerations. The considerations can include, for example, a preference of an associated content provider or a social networking system, a user to be provided access to the ephemeral media content item, a type or classification associated with the ephemeral media content item, etc. In some embodiments, access by a content provider to its own ephemeral media content items does not expire after the selected period of time. Rather, in some embodiments, access by the content provider to its own ephemeral media content items can be maintained indefinitely.

The ephemerality designation module 204 can present an option for a content provider to designate (or label) its media content item as an ephemeral content item or a non-ephemeral media content item. The ephemerality designation module 204 can present the option through a suitable interface. In some embodiments, when a media content item is presented to a content provider through the interface, the option can be presented as one or more elements in the interface selectable by the content provider. In some embodiments, a media content item by default can be designated as a non-ephemeral media content item. In this regard, upon selection of an element presented on the interface, the content provider can designate the media content item to be an ephemeral media content item. In other embodiments, a media content item by default can be designated as an ephemeral media content item. In this regard, upon selection of the element, the content provider can designate the media content item to be a non-ephemeral media content item.

Based on designation of a media content item as an ephemeral media content item or a non-ephemeral media content item, the access handling module 206 can manage access to the media content item. In some embodiments, the access handling module 206 can provide to a content provider indefinite access to its ephemeral media content items while providing to selected users temporary access to the ephemeral media content items. In some embodiments, an interface can be presented to a content provider to allow the content provider to access a profile or archive of its media content items. In some embodiments, media content items in the profile or archive can be labeled or categorized as ephemeral or non-ephemeral. For example, the profile or archive can be segmented with a first portion containing non-ephemeral media content items and a second portion containing ephemeral media content items. In various embodiments, the profile or archive, and media content items therein, can be public or private. The interface can allow the content provider to navigate and browse through ephemeral media content items (and non-ephemeral media content items) of the content provider, including ephemeral media content items that were previously but no longer accessible to others.

The access handling module 206 can provide notifications about availability of media content items accessible to selected users of the social networking system. In some embodiments, the selected users can include some or all followers of content providers associated with the media content items. In some embodiments, the access handling module 206 can provide notifications about availability of ephemeral media content items through a first element of a suitable interface presented to a user and, at the same time, can provide non-ephemeral media content items through a second element of the interface. In some embodiments, as discussed in more detail herein, the first element and the second element can be distinct, separate feeds. In various embodiments, the access handling module 206 can provide access to an ephemeral media content item in response to a search of media content items performed by a user that has access to the ephemeral media content item. In various embodiments, the access handling module 206 can provide access to an ephemeral media content items through an explorer mode in which ephemeral media content items of potential interest are provided to a user. In some embodiments, the access handling module 206 can provide access to an ephemeral media content item to a user in a direct communication between the user and, for example, a content provider associated with the ephemeral media content item. Many variations are possible.

Ephemeral media content items of a content provider can be presented to selected users through a suitable interface. The interface can constitute a channel of the ephemeral media content items of a content provider. In some embodiments, upon selection of an ephemeral media content item of a content provider to which a user has been provided access, the ephemeral media content items associated with the content provider can be viewable as a channel by the user. In some instances, the ephemeral media content items (e.g., video, audio, images) can be automatically presented or played back to a user as a slideshow of media content items. In some instances, the user can apply a touch gesture, such as a tap, to the interface to advance from one ephemeral media content item to the next ephemeral media content item. In some embodiments, ephemeral media content items from advertisers can be included among the ephemeral media content items in the channel associated with the content provider. In various embodiments, the social networking system can include ephemeral media content items of other content providers in the channel to encourage a user to form new connections with other entities, such as businesses, on the social networking system.

In some embodiments, after access by one or more users to one or more ephemeral media content items has expired, the content provider can re-select the ephemeral media content items to be accessible to the users or other users for another, temporary selected period of time. In this regard, the content provider can select one or more ephemeral media content items that were previously but no longer accessible to the users. The ephemeral media content items can be appear in a profile or archive of the content provider. In some instances, the ephemeral media content items can be labeled to indicate that they were previously accessible. Through a suitable interface, the content provider can provide to the same users or different users access to the ephemeral media content items as ephemeral media content items for another selected period of time.

In some embodiments, the content provider can share a combination of ephemeral media content items and non-ephemeral media content items. As described in more detail below, the ephemeral media content items may have been presented in a first element through which ephemeral media content items are accessible and the non-ephemeral media content items may have been presented in a second element of non-ephemeral media content items. Through a suitable interface, the content provider can select previously accessible ephemeral media content items to be shared again as non-ephemeral media content items. In some instances, the selected ephemeral media content items can be combined with one or more other non-ephemeral media content items, and then shared individually or as a collection (or album) of non-ephemeral media content items. As described in more detail below, the shared media content items can be published in feeds of non-ephemeral media content items presented to the content provider and other users of the social networking system. When shared media content items constitute a collection, the shared media content items can be maintained as a collection in a profile or archive of the content provider.

The access handling module 206 can deny access to an ephemeral media content item to selected users upon expiration of a selected period of time. The denial of access can occur automatically without intervention or other action from a content provider or a user. For each ephemeral media content item, the access handling module 206 can determine an initial time from which the selected period of time is measured. For each ephemeral media content item, the access handling module 206 also can associate a selected period of time after which access to the ephemeral media content item by selected users expires. In some embodiments, the initial time for an ephemeral media content item can be a time when the ephemeral media content item is first made accessible to any user. As discussed herein, different ephemeral media content items can be associated with various selected periods of time after which the ephemeral media content items expire. In some embodiments, upon lapse of a selected period of time from an initial time associated with an ephemeral media content item, the access handling module 206 can deny access to the ephemeral media content item to all selected users that had access to the ephemeral media content item.

The channel module 208 can present media content items of content providers to selected users in separate channels. In some embodiments, as discussed, the channel module 208 can provide ephemeral media content items accessible to a user in a first element of an interface presented to the user and, at the same time, can provide non-ephemeral media content items accessible to the user in a second element of the interface. In some embodiments, the elements can be feeds (or channels) for presenting media content items. For example, the first element can be a first feed, and the second element can be a second feed. In some embodiments, the first feed can be presented as a listing (or array) of identifiers of content providers that have provided ephemeral media content items accessible to the user. An identifier of a content provider can be an image, profile picture, symbol, avatar, or other representation of the content provider. In some cases, the first feed can present information about accessible ephemeral media content items of each content provider. For example, the first feed can indicate a type of the ephemeral media content items. In one case, the type of the ephemeral media content item can indicate whether subject matter reflected in the ephemeral media content item is occurring live (in real time or near real time). The content providers reflected in the first feed can be presented in a ranked order, as discussed in more detail herein. A user can apply, through the interface, an input, such as a touch gesture, to an identifier of a content provider to access ephemeral media content items of the content provider. In response to the input, the interface can present one or more ephemeral media content items of the content provider that are accessible to the user. To advance through multiple ephemeral media content items, the user can apply an appropriate touch gesture (e.g., a tap) to the interface. In some embodiments, when all of the ephemeral media content items of a content provider accessible to a user have been accessed by the user, the interface can present the identifier of the content provider in a manner that reflects such access. In one instance, the identifier for the content provider can appear differently from an identifier of another content provider whose accessible ephemeral media content items have not all been accessed by the user. For example, the identifier of the content provider whose ephemeral media content items have all been accessed by the user can be greyed out or blurred in the first feed. In some embodiments, the identifier of a content provider whose ephemeral media content items are no longer accessible to a user can be removed from a first feed of the user. For example, the identifier of the content provider can be removed from the first feed upon expiration of access to all ephemeral media content items of the content provider. In some embodiments, the second feed can be a listing (or array) of non-ephemeral media content items determined to be relevant to a user. In some embodiments, the first feed and the second feed can be scrollable by a user. In some cases, the first feed can be scrollable in a first direction and the second feed can be scrollable in a second direction different from the first direction (e.g., an orthogonal direction). For example, the first feed can be scrollable in a horizontal direction and the second feed can be scrollable in a vertical direction. In some embodiments, a container of media content items can be accessible from the first feed, as discussed in more detail herein.

Figure 3A:
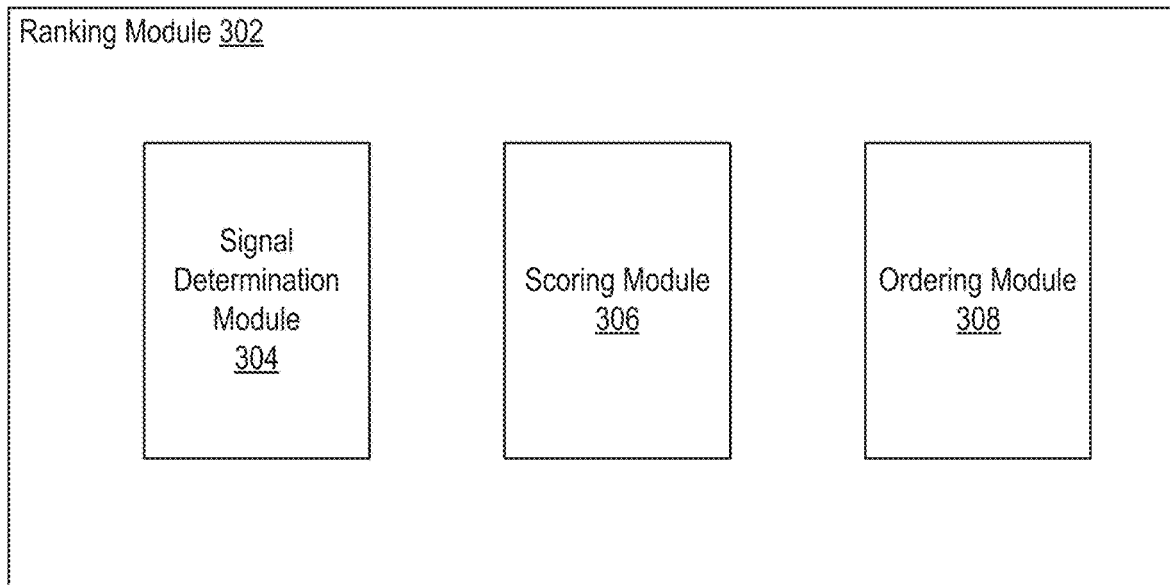
FIG. 3A illustrates an example ranking module, according to an embodiment of the present technology.

FIG. 3A illustrates an example ranking module 302, according to an embodiment of the present technology. The ranking module 302 can generate a ranked ordering of content providers reflected in a first element of an interface presented to a user. In some embodiments, the ranking module 106 of FIG. 1 can be implemented with the ranking module 302. The ranking module 302 can include a signal determination module 304, a scoring module 306, and an ordering module 308.

The signal determination module 304 can obtain one or more signals to prioritize presentation to a selected user of a plurality of content providers associated with ephemeral media content items accessible to the user. The signals can include any appropriate considerations relating to identification of ephemeral media content items of most relevance or interest to the user. In some embodiments, the signals can be based on a relationship between a user and a content provider whose ephemeral media content items are accessible to the user. In some embodiments, a signal can be based on whether a user has subscribed to notifications about actions taken by a content provider on a social networking system. For example, the actions can relate to management and provision of media content items by the content provider on the social networking system. Ephemeral media content items of a content provider associated with notifications to which the user has subscribed can be relatively more relevant to the user. In some embodiments, a signal can be based on a number of likes or other expressions of approval by a user regarding media content items of a content provider. Ephemeral media content items of a content provider that enjoys a high number of likes from the user can be relatively more relevant to the user. In some embodiments, a signal can be based on whether a user is a follower of a content provider and the content provider is a follower of the user (i.e., mutual following). Ephemeral media content items of a content provider with which the user has a mutual relationship of following can be relatively more relevant to the user.

In other embodiments, additional signals may be relevant. For example, a signal can be based on timing since an ephemeral media content item became accessible. As another example, a signal can be based on a level of interaction between a user and ephemeral media content items of a content provider. A level of interaction can relate to a degree or frequency to which a user accesses and consumes ephemeral media content items of a content provider. As yet another example, a signal can be based on a connection status between the user and a content provider. The signal determination module 304 can obtain other signals that inform a determination of relevance of an ephemeral media content item to a user.

The scoring module 306 can generate a relevance score indicating a level of relevance of an ephemeral media content item to a user based on signals determined by the signal determination module 304. In some embodiments, for an ephemeral media content item, the scoring module 306 can assign a quantitative value for each signal that reflects the strength of the signal. The scoring module 306 also can determine a weight associated with each signal. The weight can reflect the relative importance of the signal in a determination of relevance of the ephemeral media content item to the user. A weight can be applied (e.g., multiplied) to a quantitative value of the associated signal to generate a component score. The component scores associated with all of the signals can be aggregated (e.g., summed) to generate the relevance score for the ephemeral media content item. Other techniques to determine a relevance score for an ephemeral media content item are possible.

The ordering module 308 can sort ephemeral media content items associated with a plurality of content providers. In some embodiments, the ephemeral media content items can be sorted in a ranked ordering based on their relevance scores. The plurality of content providers associated with the ephemeral media content items can be sorted in a ranked ordering of the plurality of content providers that is consistent with the ranked ordering of the ephemeral media content items. For example, if a first ephemeral media content item associated with a first content provider is ranked higher than a second ephemeral media content item associated with a second content provider, the first content provider is ranked higher than the second content provider. In some embodiments, a number of the plurality of content providers in the ranked ordering of the plurality of content providers that satisfy a threshold value can be presented to a user. For example, if a count of the plurality of content providers in a ranked ordering is larger than the threshold value, only a number equal to the threshold value of the plurality of content providers are presented to the user. As discussed, identifiers of the content providers in a ranked ordering can be provided for presentation to the user through a first element of a suitable interface. In some embodiments, as additional or new ephemeral media content items become accessible to a user, the ranking module 302 can perform a new ranking of ephemeral media content items, including the new ephemeral media content items and the previous ephemeral media content items, to update the ranked ordering of the plurality of content providers. A new ranking can be performed at any suitable time. For example, a new ranking can be performed after a threshold number of new ephemeral media content items are made available to a user or at selected intervals of time.

Figure 3B:
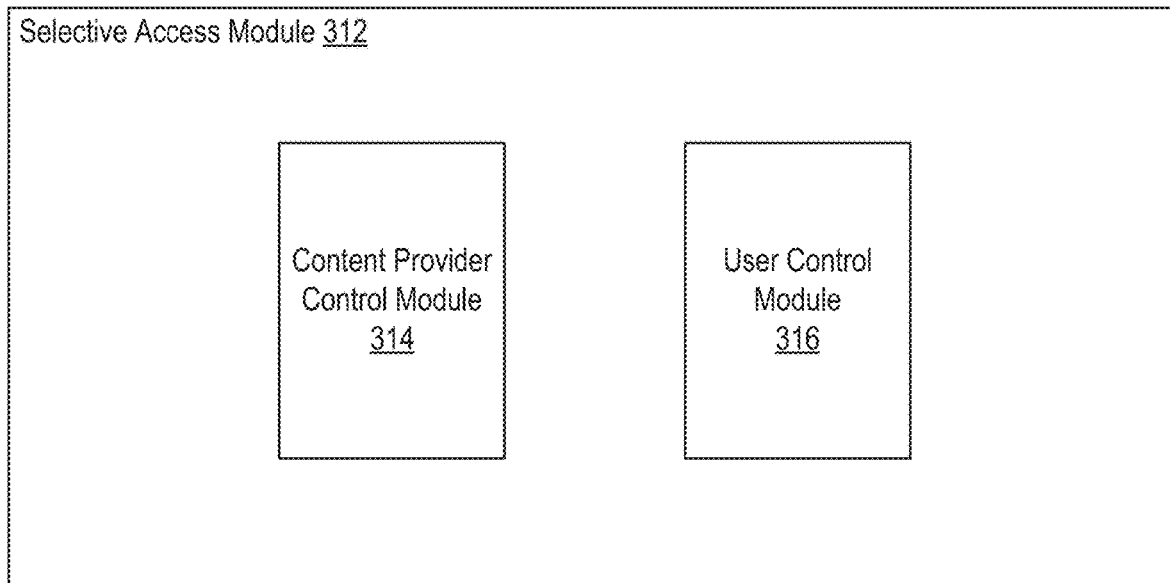
FIG. 3B illustrates an example selective access module, according to an embodiment of the present technology.

FIG. 3B illustrates an example selective access module 312, according to an embodiment of the present technology. The selective access module 312 can allow a content provider to control access by selected users to its ephemeral media content items. The selective access module 312 also can allow a user to control presentation of ephemeral media content items to the user. In some embodiments, the selective access module 108 of FIG. 1 can be implemented with the selective access module 312. The selective access module 312 can include a content provider control module 314 and a user control module 316.

The content provider control module 314 can allow a content provider to control access by users to ephemeral media content items of the content provider. The content provider control module 314 can allow the content provider to select, through a suitable interface, one or more users who are not permitted to access its ephemeral media content items. In some embodiments, the content provider control module 314 can provide a listing of users who can access content items of the content provider. The listing can be presented through the interface. The listing can include an avatar or other identifier for each user in the list. The listing can include for each user an option for the content provider to deny access to ephemeral media content items of the content provider to the user. For example, the option can be provided through a toggle or button that, when selected, alternates between permitting access and denying access. In various embodiments, the content provider control module 314 can provide a search tool to allow a content provider to search for a user for which access to ephemeral media content items of the content provider is to be denied. When the user is presented in an interface in response to the search, the content provider can select an element in the interface to deny the user access to the ephemeral media content items of the content provider.

In some embodiments, the content provider can control access to ephemeral media content items to a user before and after the user has accessed an ephemeral media content item of the content provider. The content provider can deny access to a selected user after the user has accessed one or more ephemeral media content items of the content provider. In this regard, the content provider control module 314 can present, through a suitable interface, to a content provider a listing of users (viewers list) who have previously accessed ephemeral media content items of the content provider. For example, the list of users can be presented as avatars of the users. The interface can allow the content provider to provide one or more inputs to deny a user in the listing further access to ephemeral media content items of the content provider. For example, the application of a touch gesture to an avatar associated with a user can allow the content provider to deny the user further access to (or hide) ephemeral media content items of the content provider. In some embodiments, for a content provider having a large number of followers (e.g., celebrities), statistics regarding a number of persons who follow the content provider and a number of views of ephemeral media content items of the content provider can be presented to the content provider instead of a listing of users. In some embodiments, when a user is denied access to ephemeral media content items of the content provider, the ephemeral media content items are not presented to the user in various manners. For example, an identifier of the content provider can be omitted from and not presented in a first element (or first feed) of the user through which ephemeral media content items are accessible. As another example, the ephemeral media content items are not presented to the user in a profile or archive of the content provider. As yet another example, the ephemeral media content items are not presented in search results returned in response to a search or in an explorer mode in which ephemeral media content items of potential interest are provided to the user. In some embodiments, the content provider can select an option to make ephemeral media content items accessible only to its followers. The ability for a content provider to control access to its ephemeral media content items can contribute to a sense of comfort when the content provider shares on a social networking system, thus encouraging more sharing.

The user control module 316 can allow a user to control indications or notifications provided to the user about accessible ephemeral media content items associated with content providers. The user control module 316 can allow a user to select one or more content providers associated with accessible ephemeral media content items about which notifications are not desired by the user. In some embodiments, the user control module 316 can prevent presentation of (or mute) a selected content provider in a first element displaying identifiers of content providers with ephemeral media content items accessible to the user. For example, the user can, through a suitable interface, long press and drag away from or out of the first element an avatar of a selected content provider to no longer be presented with notifications about the availability of ephemeral media content items of the content provider. In some embodiments, the user control module 316 can provide, through the interface, a listing of content providers having ephemeral media content items to which the user has potential access. The user can provide an input to the interface to identify selected content providers from the listing and to remove their potential appearance in the first element. The control of presentation of content providers in this manner can be an alternative to potentially unfollowing or blocking content providers.

Figure 3C:
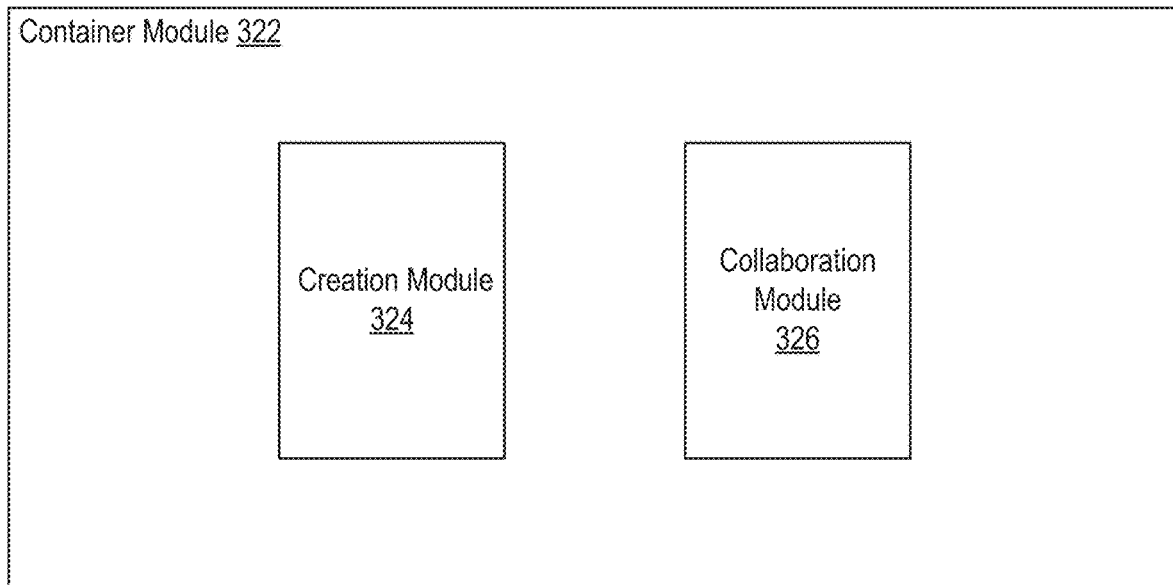
FIG. 3C illustrates an example container module, according to an embodiment of the present technology.

FIG. 3C illustrates an example container module 322, according to an embodiment of the present technology. The container module 322 can allow a content provider and collaborators to organize related media content items into container (or reel). In some embodiments, the container module 110 of FIG. 1 can be implemented with the container module 322. The container module 322 can include a creation module 324 and a collaboration module 326.

The creation module 324 can allow a content provider to create a container for related media content items, including ephemeral media content items, of the content provider. A container can be associated with a distinct event, category, interest, subject matter, or other characteristic. Related media content items can be assigned to a container based on their relevance to a characteristic of the container. Different containers can serve as various media channels for content providers, including prolific publishers of media content items. In some embodiments, after capture of a media content item, such as an image, video, or audio, the creation module 324 can present, through a suitable interface, to a user an option to create a container. Upon selection of the option, the user can enter a name (or title) for the container. The name can be descriptive of the media content items to be associated with the container or otherwise related to a characteristic of the container. For example, if a container is to be associated with media content items that relate to a certain event, the name can identify or describe the event. After creation of the name, the creation module 324 assign a media content item to the container. Further, the creation module 324 can automatically assign to the container media content items subsequently captured by the content provider that are relevant to the container. In some embodiments, the creation module 324 can receive time, location, and other parameters associated with the container. When media content items satisfy the parameters, the media content items can be automatically assigned to the container. When media content items do not satisfy the parameters, the media content items are not automatically assigned to the container. For example, a content provider can provide parameters relating to a time duration and a geographic location for an event associated with a container. In this example, the creation module 324 can obtain time information and location information for each media content item captured by a computing device of the content provider. The time information and the location information can be available through functionality of the computing device or a software application running on the computing device. When time information and location information for a media content item captured by a content provider fall within the parameters, the media content item can be automatically assigned to the container without further input from the content provider. When time information and location information for a media content item fall outside the parameters, the media content item is not automatically assigned to the container. The creation module 324 can allow a content provider to edit a preexisting container of the content provider or create one or more new containers.

A container and associated media content items can be accessible by selected users for a temporary, selected period of time. In some embodiments, a container can be accessible for a selected period of time without regard to its associated ephemeral media content items. The container can be accessible for a selected period of time after a certain action, such as creation of the container. For example, if a container is associated with multiple ephemeral media content items that have been assigned to the container at different times, access to the ephemeral media content items will expire upon lapse of the selected period of time measured from a time when the container was created. In this regard, expiration of access to the ephemeral media content items does not depend on times when the media content items were made accessible to users or times when the media content items were added to the container. In various embodiments, accessibility of an ephemeral media content item in a container can expire based on passage of a selected period of time specific to the ephemeral media content item, regardless of a time when the container was created. For example, accessibility of an ephemeral media content item in a container can expire after a selected period of time measured from a time when the ephemeral media content item was assigned to a container. In this regard, a container can have a first ephemeral media content item assigned to the container at a first time and a second ephemeral media content item assigned to the container at a second time after the first time. In this example, access to the first ephemeral media content in the container can expire after a selected period of time from when the first ephemeral media content item was added to the container. After such expiration, the second ephemeral media content item still can be accessible in the container until passage of the selected period of time measured from a time when the second ephemeral media content item was added to the container. As another example, access to an ephemeral media content item in a container can expire after a selected period of time measured from a time when the ephemeral media content item was first made accessible to other selected users. In this example, after expiration of access to the ephemeral media content item, the ephemeral media content item is not present in the container. Accordingly, access to ephemeral media content items first made accessible to selected users at different times will expire at different times. In some embodiments, a container can be accessed from a profile or archive of the content provider. For example, the container can be represented by a selectable icon (or thumbnail) in a suitable interface for presenting the profile or archive. In some embodiments, a container can be accessible by a selected user in a first element through which ephemeral media content items are accessible, as discussed herein. In some embodiments, a container can be presentable in the first element for as long as access to the container has not expired or as long as at least one ephemeral media content item of the container remains accessible. In various embodiments, a container can be presented in a first element based on a ranking technique, such as a ranking technique described herein, applied to one or more media content items assigned to the container. In some embodiments, a container associated with a content provider can be represented in a first element by an icon of the container, an identifier of the content provider, or a media content item assigned to the container. Upon expiration of access to a container or all of the ephemeral media content items of the container, the container can be removed or not presented in the first element of the user.

The collaboration module 326 can allow a content provider to invite contributions of media content items, including ephemeral media content items, from collaborators to a container created by the content provider. The content provider and selected collaborators can be participating in a common event or otherwise share a common interest or characteristic. In some embodiments, the collaboration module 326 can present a suitable interface that allows a content provider to select one or more collaborators who can contribute ephemeral media content items to a container in a cooperative or collaborative effort. The container can be associated with related media content items, as discussed. The content provider can act as an administrator for the container. In some embodiments, the collaboration module 326 can present through an interface a selection of followers or other connections of a content provider. The content provider can select certain connections as collaborators for a container. In some embodiments, a collaborator can invite other collaborators to contribute ephemeral media content items to the container. Based on an input to the interface, the content provider can remove one or more collaborators from collaboration relating to a container. In some embodiments, based on an input to the interface, a collaborator who invited another collaborator to contribute to a container can remove the other collaborator from further collaboration relating to the container. Based on an input to the interface, a collaborator may choose to end its collaboration relating to a container.

A container to which a content provider and collaborators have contributed can be accessible to the content provider and the collaborators on their respective profiles or archives.

In some embodiments, the collaboration module 326 through, an input to a suitable interface, can present to the content provider an identification of all contributors to a container. In some embodiments, users having access to a container reflecting collaboration by a content provider and collaborators can include followers of the content provider and followers of the collaborators. In some embodiments, a container reflecting collaboration of a content provider and collaborators can be presented in an element of an interface, such as a first feed through which ephemeral media content items are accessible, as described. For example, the container reflecting collaboration can be presented in first feeds of the content provider, the collaborators, and followers of the content provider and the collaborators. In some embodiments, the container reflecting collaboration can be represented in the first element by a thumbnail of a media content item associated with the container as well as identifiers, such as avatars, of the associated content provider and collaborators. For example, a stack of identifiers of the content provider and the collaborators can appear adjacent to or at a fixed position with respect to appearance of a thumbnail of a first ephemeral media content item assigned to a container. In some embodiments, if a content provider or a collaborator is associated with multiple containers reflecting collaboration, the multiple containers can be presented as separate items in a first element of a user having access to the containers. Expiration of a container reflecting collaboration and ephemeral media content items thereof is described as set forth above in connection with a container to which a content provider alone can contribute.

Figure 3D:
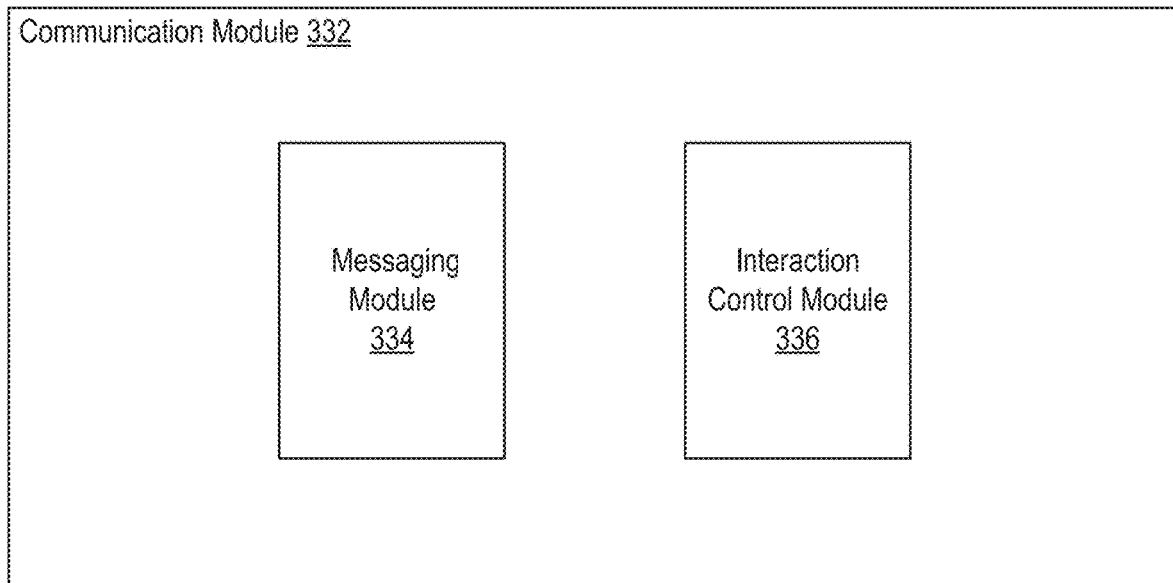
FIG. 3D illustrates an example communication module, according to an embodiment of the present technology.

FIG. 3D illustrates an example communication module 332, according to an embodiment of the present technology. The communication module 332 can allow members of a social networking system to communicate regarding media content items subject to controls set by a content provider. In some embodiments, the communication module 112 of FIG. 1 can be implemented with the communication module 332. The communication module 332 can include a messaging module 334 and an interaction control module 336.

The messaging module 334 can provide messaging functionality for members of a social networking system, such as a content provider of ephemeral media content items and a user who accesses ephemeral media content items. In some embodiments, the messaging module 334, through a suitable interface, can allow a user and a content provider to exchange direct messages (e.g., instant messages). In some embodiments, when a user is viewing, through the interface, an ephemeral media content item of a content provider, the user can provide one or more inputs to the interface to initiate and send a message to the content provider. The message can be directed to an inbox of the content provider. The content provider can provide an input to the interface to access the inbox, review the message, and respond to the message. A content provider likewise can message a user. In some embodiments, when a member of the social networking system is viewing an ephemeral media content item of a content provider, the member can swipe in a first direction (e.g., left, right, up, down) to access an inbox of the member. In this example, the member can swipe in a second direction (e.g., opposite from the first direction) to advance to ephemeral media content items of another content provider. Many variations are possible.

The interaction control module 336 can selectively control messages sent to a content provider. The interaction control module 336 can provide one or more options in a suitable interface selectable by a content provider to control messages provided to the content provider. In some embodiments, an option can be selected by the content provider to permit a user who has accessed an ephemeral media content item of the content provider to message the content provider subject to one or more conditions. For example, a condition can relate to whether the content provider is a follower of the user. In this example, the content provider can select an option so that, if the content provider is a follower of the user, the user is permitted to message the content provider. If the content provider is not a follower of the user, the user is not permitted to message the content provider. This option can be helpful for popular content providers (e.g., celebrities) to control an amount of messages directed to them.

Figure 4A:
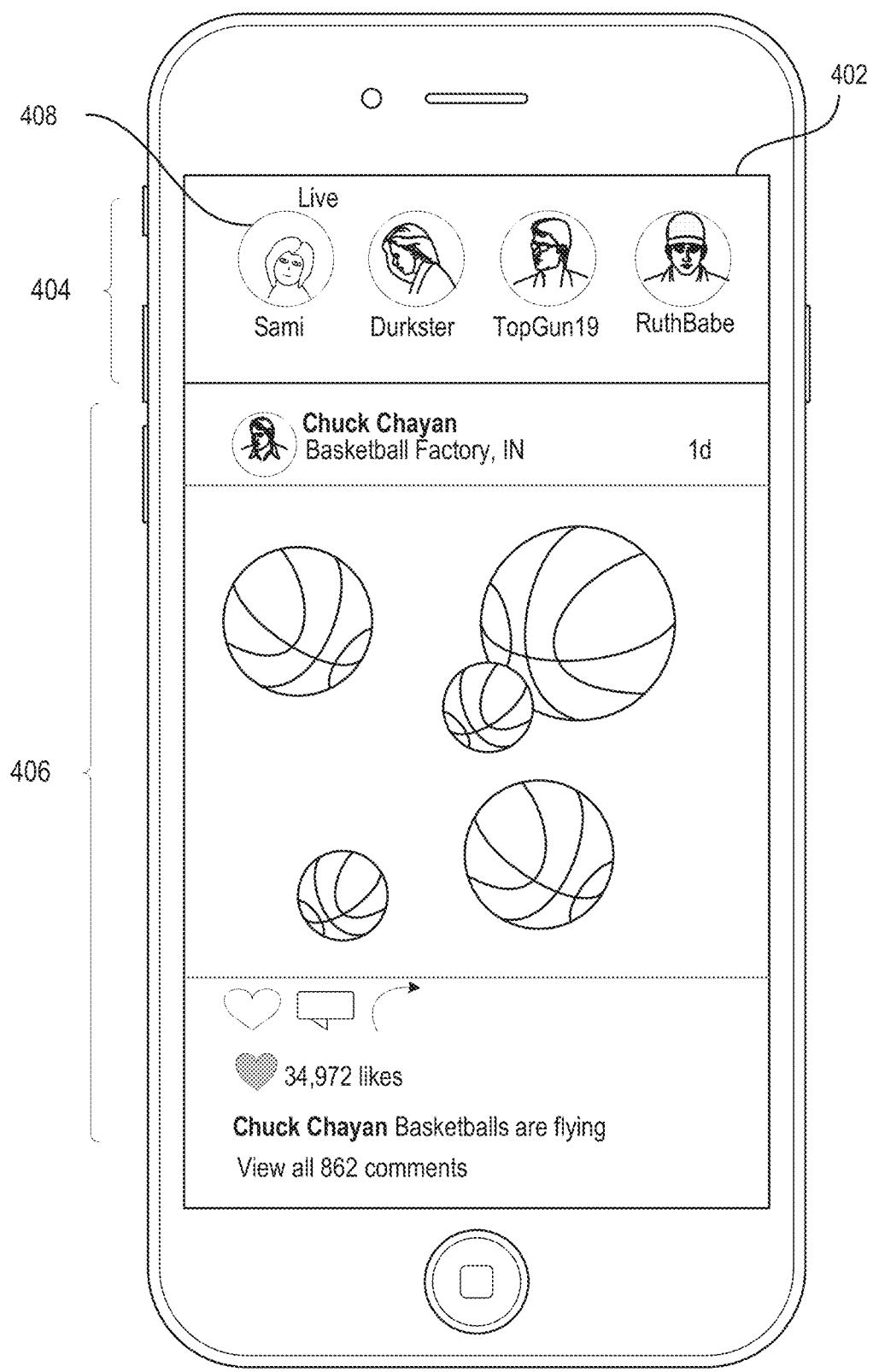
FIG. 4A illustrates an example interface for presenting a first feed through which ephemeral media content items are accessible and a second feed of non-ephemeral media content items, according to an embodiment of the present technology.

FIG. 4A illustrates an example interface 402 for presenting a first element through which ephemeral media content items are accessible and a second element of non-ephemeral media content items, according to an embodiment of the present technology. As shown, the first element is a first feed 404 and the second element is a second feed 406. The interface 402 can be a computer interface presented on a computing device associated with a user of a social networking system. The interface 402 can be presented through a touchscreen of the computing device. The interface 402 can be provided by a utility, such as a software application running on the computing device, provided by the social networking system. The first feed 404 can include a plurality of items presented as a listing or an array. The plurality of items can be identifiers of content providers having ephemeral media content items that are accessible to the user. As shown, each identifier of a content provider can include a name (e.g., user name) of the content provider and an avatar of the content provider. For example, an identifier 408 is associated with a particular content provider named "Sarni". The first feed 404 can include an indication of a type of ephemeral media content item associated with the identifier 408. As shown, the indication conveys that the ephemeral media content item is live. The second feed 406 can include a plurality of items presented as a listing or an array. The plurality of items of the second feed 406 can be non-ephemeral media content items and associated metadata, such as an identification of a content provider, a number of likes, comments, etc.

Figure 4B:
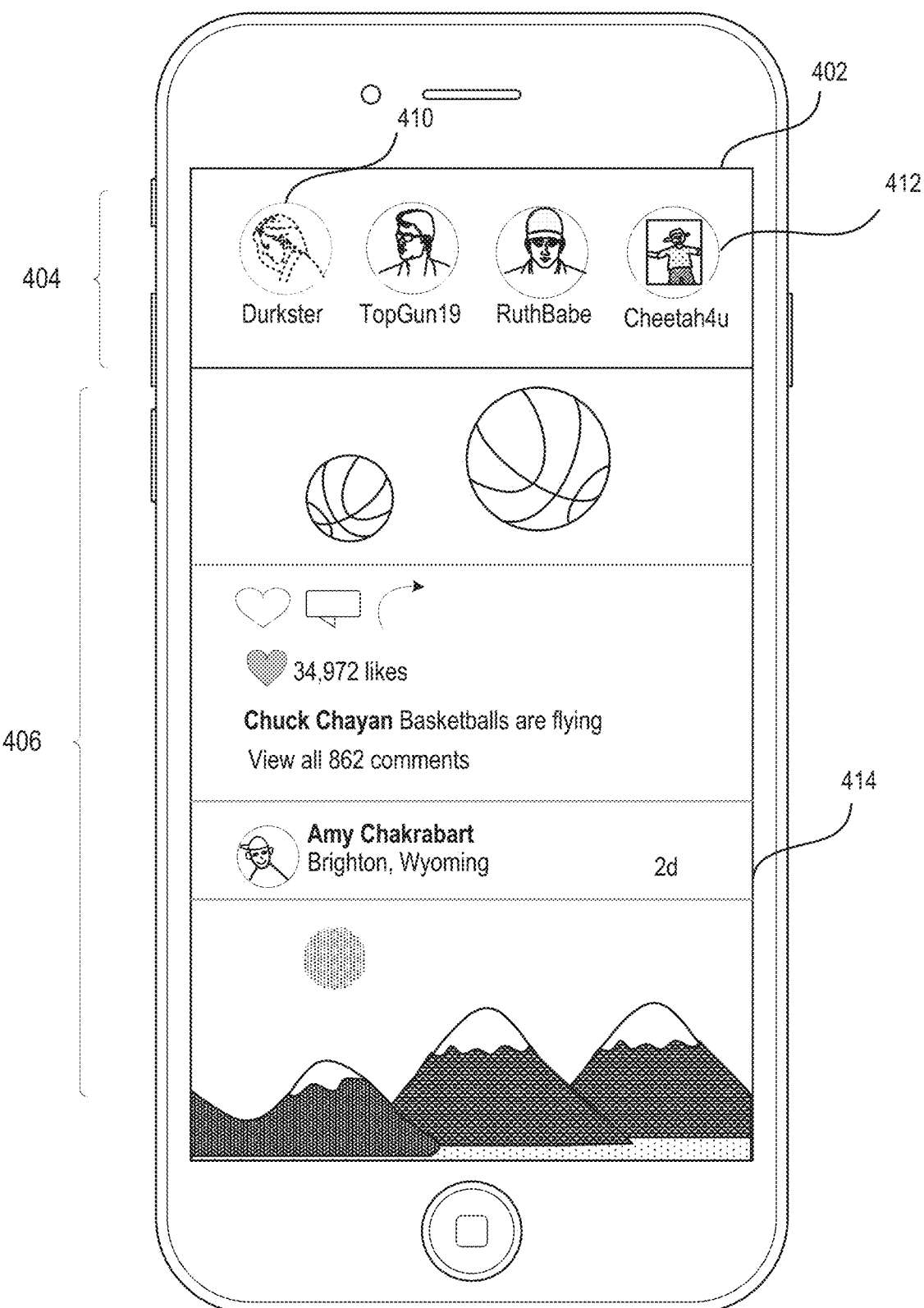
FIG. 4B illustrates an example interface for allowing scrolling of a first feed and a second feed, according to an embodiment of the present technology.

FIG. 4B illustrates an example interface 402 for allowing scrolling of a first feed 404 and a second feed 406, according to an embodiment of the present technology. The interface 402 can present the first feed 404 through which ephemeral media content items are accessible and the second feed 406 of non-ephemeral media content items. As shown, the first feed 404 is scrollable in a horizontal direction and the second feed 406 is scrollable in a vertical direction. As further shown, the first feed 404 has been scrolled to the left and, as a result, an identifier 412 of another content provider of ephemeral media content items has newly appeared in the interface 402. An identifier 410 of a content provider is greyed out to indicate that all accessible ephemeral media content items of the content provider have been accessed by the user. As shown, the second feed 406 has been scrolled up and, as a result, a new non-ephemeral media content item 414 has appeared therein.

Figure 4C:
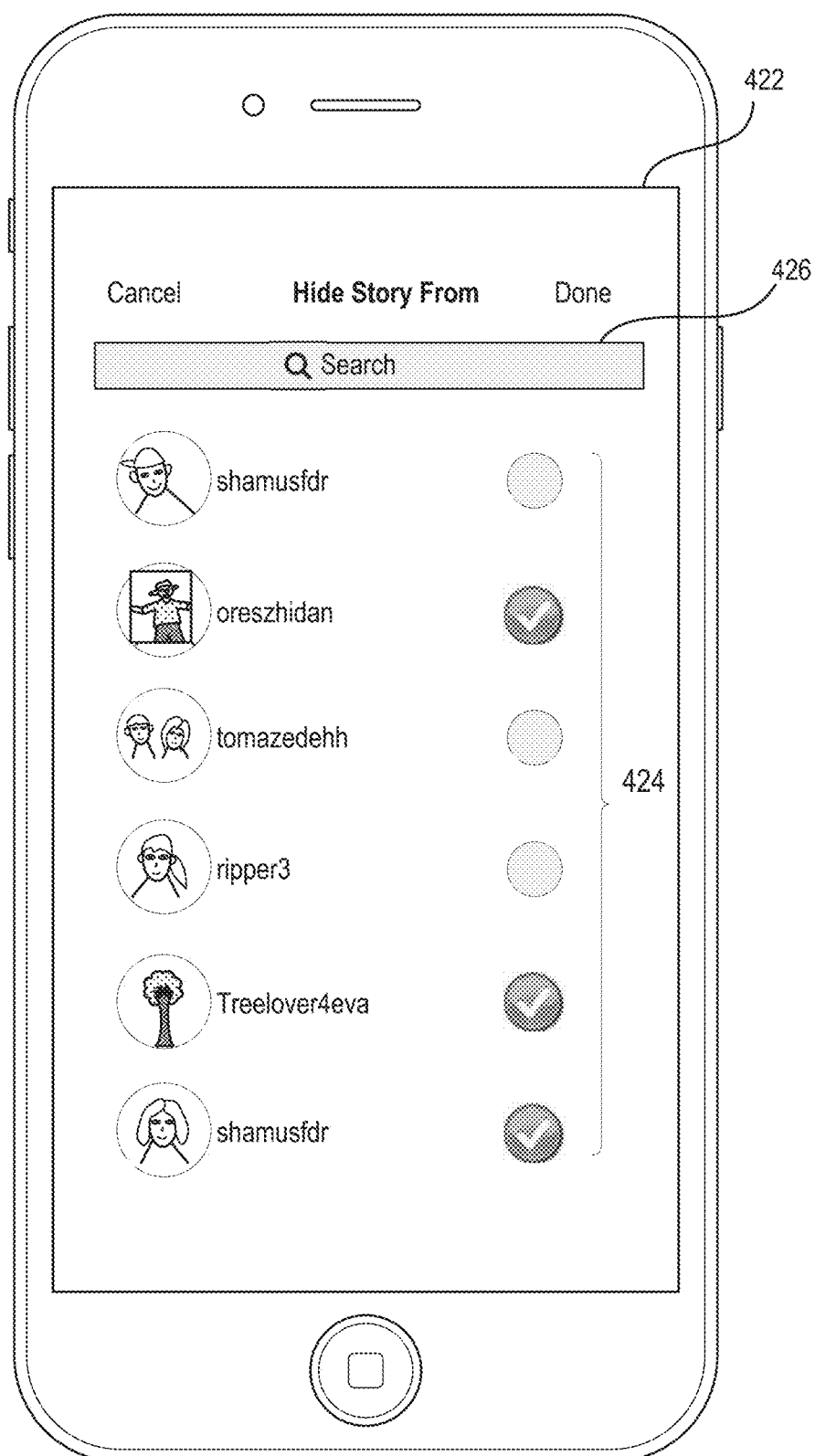
FIG. 4C illustrates an example interface for selectively denying access to ephemeral media content items, according to an embodiment of the present technology.

FIG. 4C illustrates an example interface 422 for selectively denying access to ephemeral media content items, according to an embodiment of the present technology. The interface 422 includes a listing of users 424 with potential access to ephemeral media content items of a content provider. The listing of users 424 can include followers of the content provider on a social networking system. As shown, the listing of users 424 can include a button associated with each user. Upon selection of a button by the content provider, an associated user can be denied access to the ephemeral media content items of the content provider. The interface 422 also includes a search tool 426. The search tool 426 can allow the content provider to search for one or more users that are to be denied access to ephemeral media content items of the content provider.

Figure 4D:
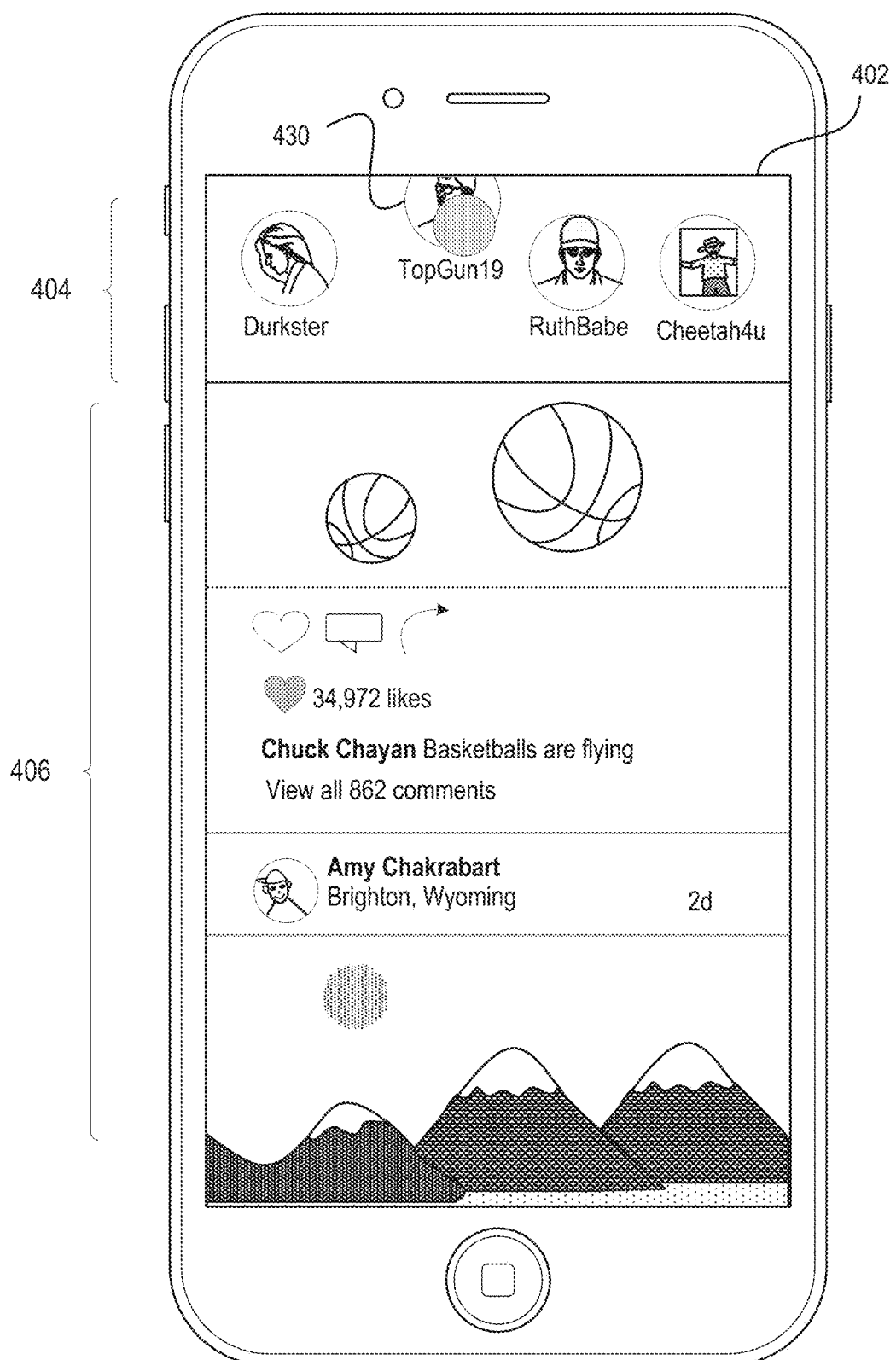
FIG. 4D illustrates an example interface for selectively preventing notifications about ephemeral media content items, according to an embodiment of the present technology.

FIG. 4D illustrates an example interface 402 for selectively preventing notifications about ephemeral media content items, according to an embodiment of the present technology. The interface 402 can present a first feed 404 through which ephemeral media content items are accessible and a second feed 406 of non-ephemeral media content items. The first feed 404 can include a plurality of identifiers of content providers whose ephemeral media content items are accessible to the user. The user can provide one or more inputs to the interface 402 to cease indications (or notifications) in the first feed 404 that ephemeral media content items of a content provider are accessible to the user. As shown, the user has selected (e.g., pressed) an identifier 430 of a content provider in the first feed 404 and is moving the identifier 430 out of the first feed 404. After the identifier 430 is removed from the first feed 404, the user will no longer receive indications in the first feed 404 that ephemeral media content items of the associated content provider are accessible to the user.

Figure 4E:
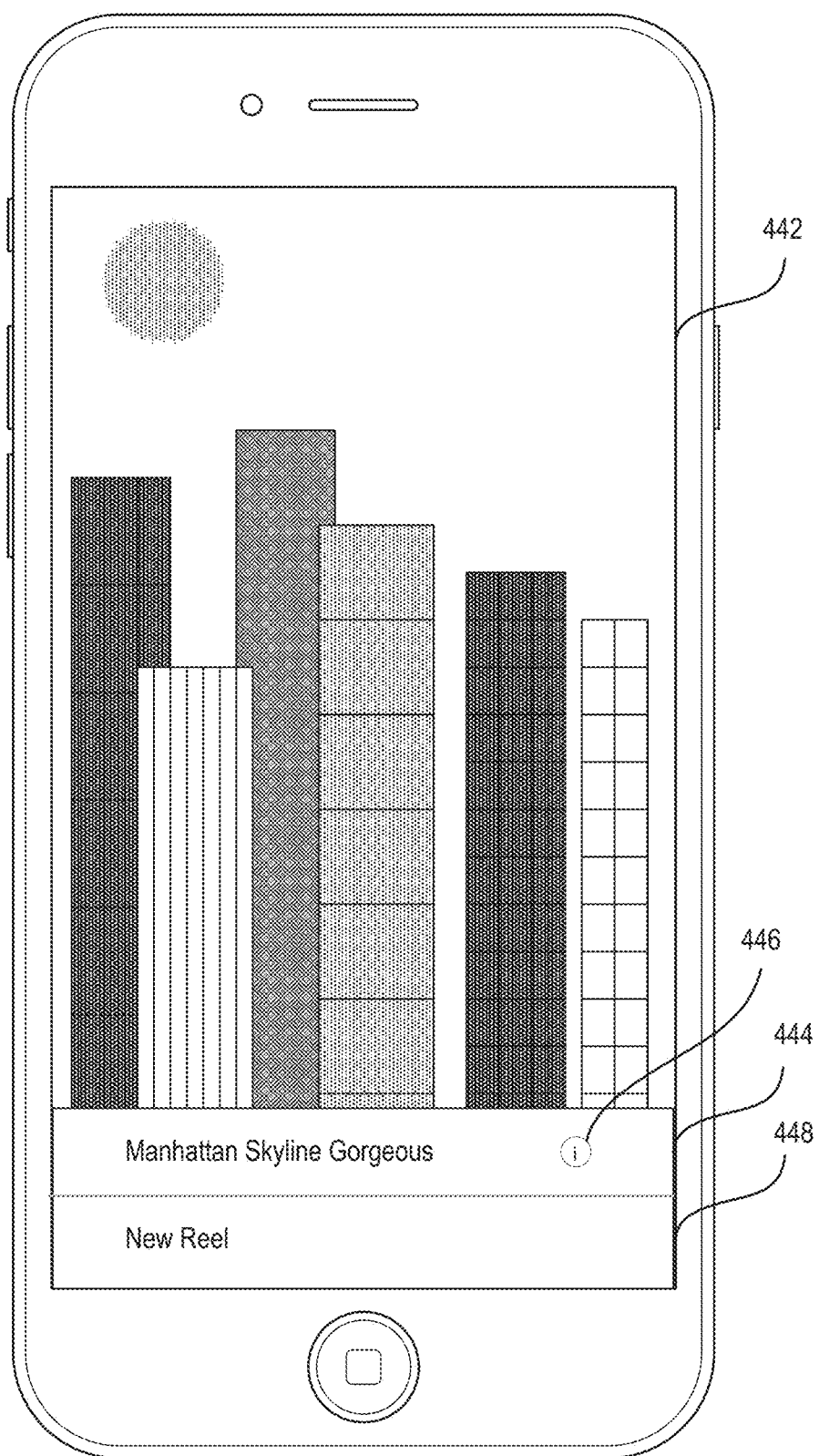
FIG. 4E illustrates an example interface for managing containers, according to an embodiment of the present technology.

FIG. 4E illustrates an example interface 442 for allowing a content provider to manage containers, according to an embodiment of the present technology. The interface 442 can be used by a content provider to edit preexisting containers of related media content items, including ephemeral media content items, or create new containers. The interface 442 can include a section 444 to edit a preexisting container. The section 444 can indicate a name of the preexisting container (e.g., "Manhattan Skyline Gorgeous"). The section 444 can include a button 446 that, upon selection, can allow a content provider to edit the container. Editing of the container can include, for example, changing the name of the container, changing parameters associated with the container, adding collaborators to the container, removing collaborators, etc. The interface 442 also can include a section 448 that allows the content provider to create a new container. Upon selection of the section 448, the content provider can be prompted to provide a name for the new container and other information relevant to set up of the container.

Figure 4F:
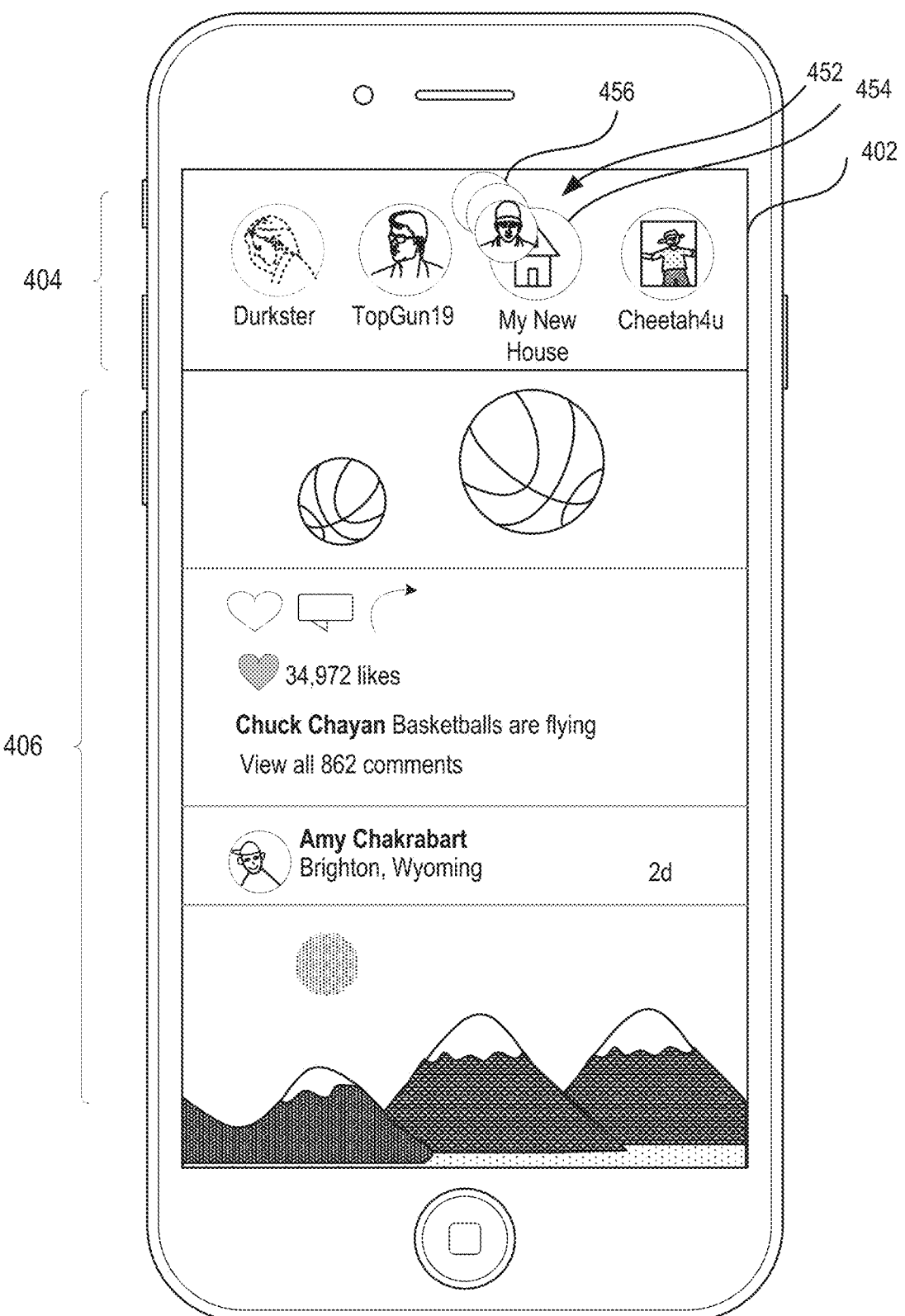
FIG. 4F illustrates an example interface for presenting a container reflecting collaboration in a first feed, according to an embodiment of the present technology.

FIG. 4F illustrates an example interface 402 for presenting to a user a container 452 reflecting collaboration in a first feed 404, according to an embodiment of the present technology. The interface 402 can present the first feed 404 through which ephemeral media content items are accessible and a second feed 406 of non-ephemeral media content items. The container 452 can appear in the first feed 404 along with identifiers of content providers whose ephemeral media content items are accessible to the user. As shown, the container 452 is represented in the first feed 404 by an ephemeral media content item 454 of the container and a stacked presentation of identifiers 456 of a content provider and collaborators that contributed ephemeral media content items to the container 452.

FIG. 5A illustrates an example method 500 for managing access to media content items through a first element and a second element, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can provide a first element in an interface presentable to a user through which a plurality of ephemeral media content items are accessible by the user for a selected period of time. At block 504, the method 500 can provide a second element in the interface through which a plurality of non-ephemeral media content items are accessible by the user. Other suitable techniques that incorporate various features and embodiments of the present technology are possible.

Figure 5B:
FIG. 5B illustrates an example method for receiving a designation of a media content item, according to an embodiment of the present technology.

FIG. 5B illustrates an example method 510 for receiving a designation of a media content item, according to an embodiment of the present technology. It should be appreciated that there can be additional, fewer, or alternative steps performed in similar or alternative orders, or in parallel, in accordance with the various embodiments and features discussed herein unless otherwise stated.

At block 512, the method 510 can receive a designation by a content provider that a media content item is an ephemeral media content item. At block 514, the method 510 can provide an identifier of the content provider for potential presentation in a first element based on the designation. Other suitable techniques that incorporate various features and embodiments of the present technology are possible.

FIG. 5C illustrates an example method 520 for ranking ephemeral media content items, according to an embodiment of the present technology. It should be appreciated that there can be additional, fewer, or alternative steps performed in similar or alternative orders, or in parallel, in accordance with the various embodiments and features discussed herein unless otherwise stated.

At block 522, the method 520 can determine levels of relevance of a plurality of ephemeral media content items associated with a plurality of content providers to a user based on ranking signals, the plurality of ephemeral media content items accessible to the user. At block 524, the method 520 can determine a ranked ordering of the plurality of ephemeral media content items based on the levels of relevance. At block 526, the method 520 can determine a ranked ordering of the plurality of content providers based on the ranked ordering of the plurality of ephemeral media content items. At block 528, the method 520 can provide an element in an interface presentable to the user based on the ranked ordering of the plurality of content providers. Other suitable techniques that incorporate various features and embodiments of the present technology are possible.

FIG. 5D illustrates an example method 530 for selectively controlling access to media content items through an element, according to an embodiment of the present technology. It should be appreciated that there can be additional, fewer, or alternative steps performed in similar or alternative orders, or in parallel, in accordance with the various embodiments and features discussed herein unless otherwise stated.

At block 532, the method 530 can provide an element in an interface presentable to a user through which a plurality of ephemeral media content items are accessible by the user. At block 534, the method 530 can receive a selection of the user from a content provider to deny the user access to ephemeral media content items of the content provider. At block 536, the method 530 can deny the user access to the ephemeral media content items of the content provider. At block 538, the method 530 can not present an identifier of the content provider in the element. Other suitable techniques that incorporate various features and embodiments of the present technology are possible.

Figure 5E:
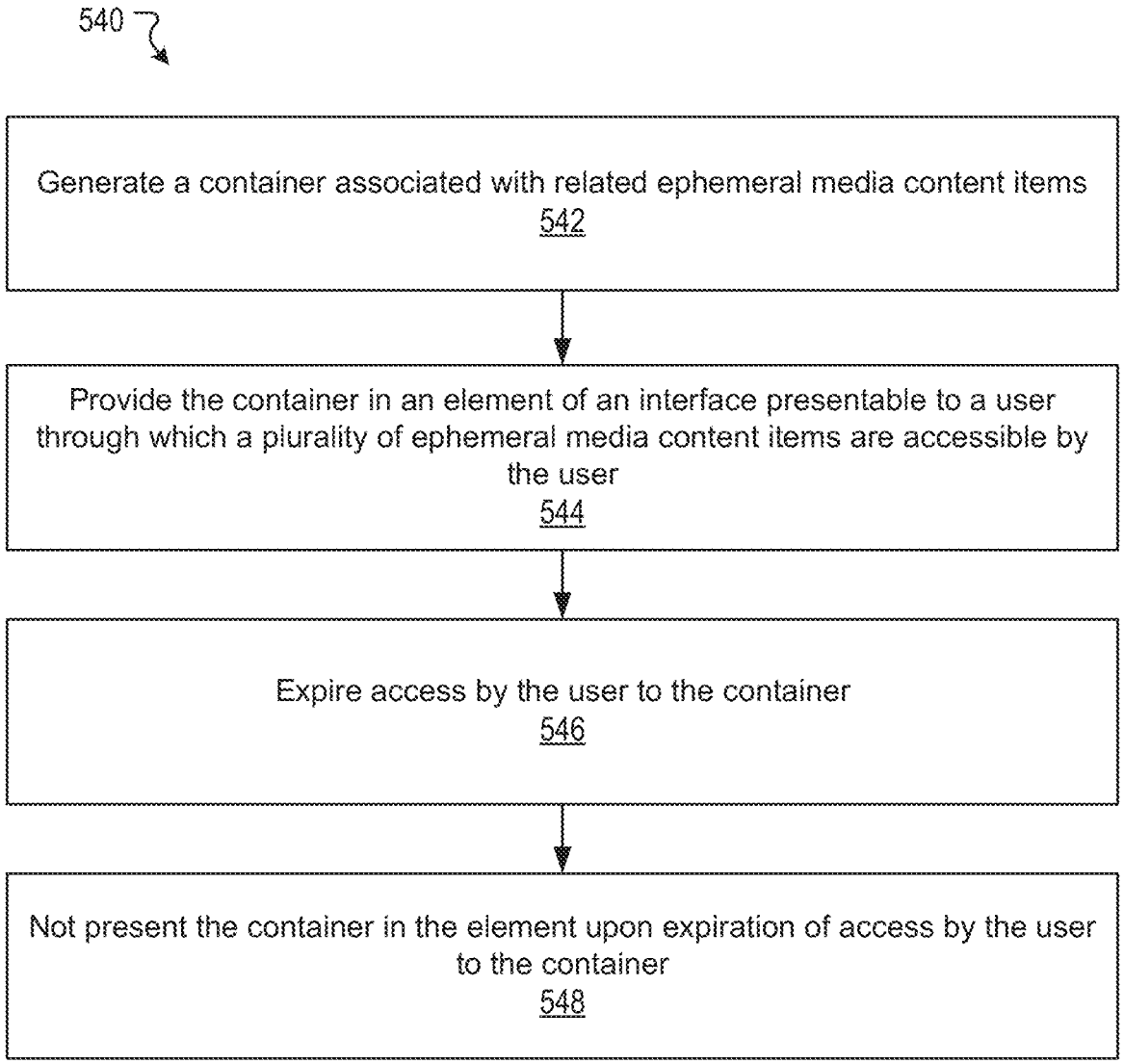
FIG. 5E illustrates an example method for managing a container of ephemeral media content items, according to an embodiment of the present technology.

FIG. 5E illustrates an example method 540 for managing a container of ephemeral media content items, according to an embodiment of the present technology. It should be appreciated that there can be additional, fewer, or alternative steps performed in similar or alternative orders, or in parallel, in accordance with the various embodiments and features discussed herein unless otherwise stated.

At block 542, the method 540 can generate a container associated with related ephemeral media content items. At block 544, the method 540 can provide the container in an element of an interface presentable to a user through which a plurality of ephemeral media content items are accessible by the user. At block 546, the method 540 can expire access by the user to the container. At block 548, the method 540 can not present the container in the element upon expiration of access by the user to the container. Other suitable techniques that incorporate various features and embodiments of the present technology are possible.

Figure 5F:
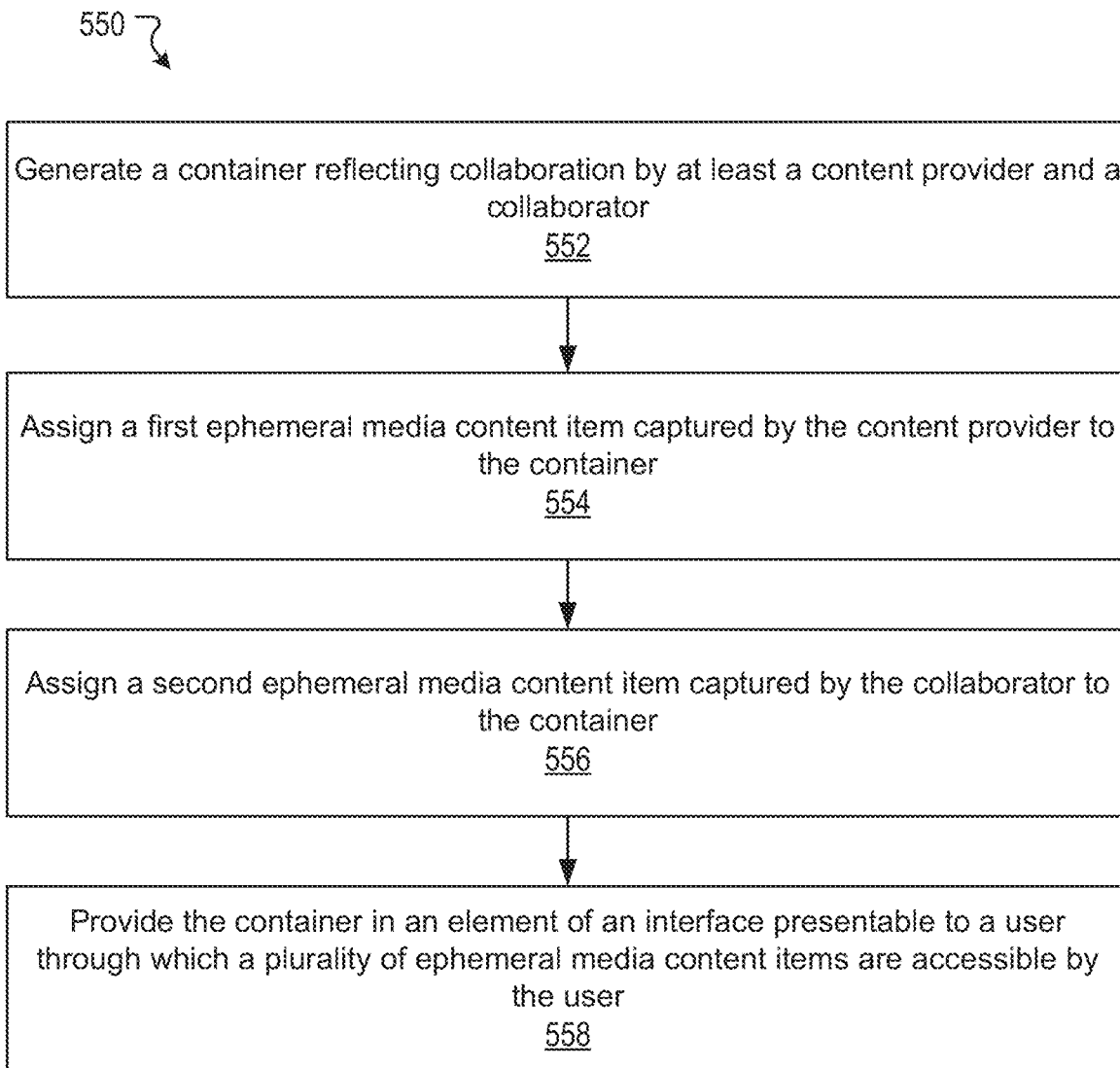
FIG. 5F illustrates an example method for providing collaboration with respect to a container, according to an embodiment of the present technology.

FIG. 5F illustrates an example method 550 for providing collaboration with respect to a container, according to an embodiment of the present technology. It should be appreciated that there can be additional, fewer, or alternative steps performed in similar or alternative orders, or in parallel, in accordance with the various embodiments and features discussed herein unless otherwise stated.

At block 552, the method 550 can generate a container reflecting collaboration by at least a content provider and a collaborator. At block 554, the method 550 can assign a first ephemeral media content item captured by the content provider to the container. At block 556, the method 550 can assign a second ephemeral media content item captured by the collaborator to the container. At block 558, the method 550 can provide the container in an element of an interface presentable to a user through which a plurality of ephemeral media content items are accessible by the user. Other suitable techniques that incorporate various features and embodiments of the present technology are possible.

Figure 5G:
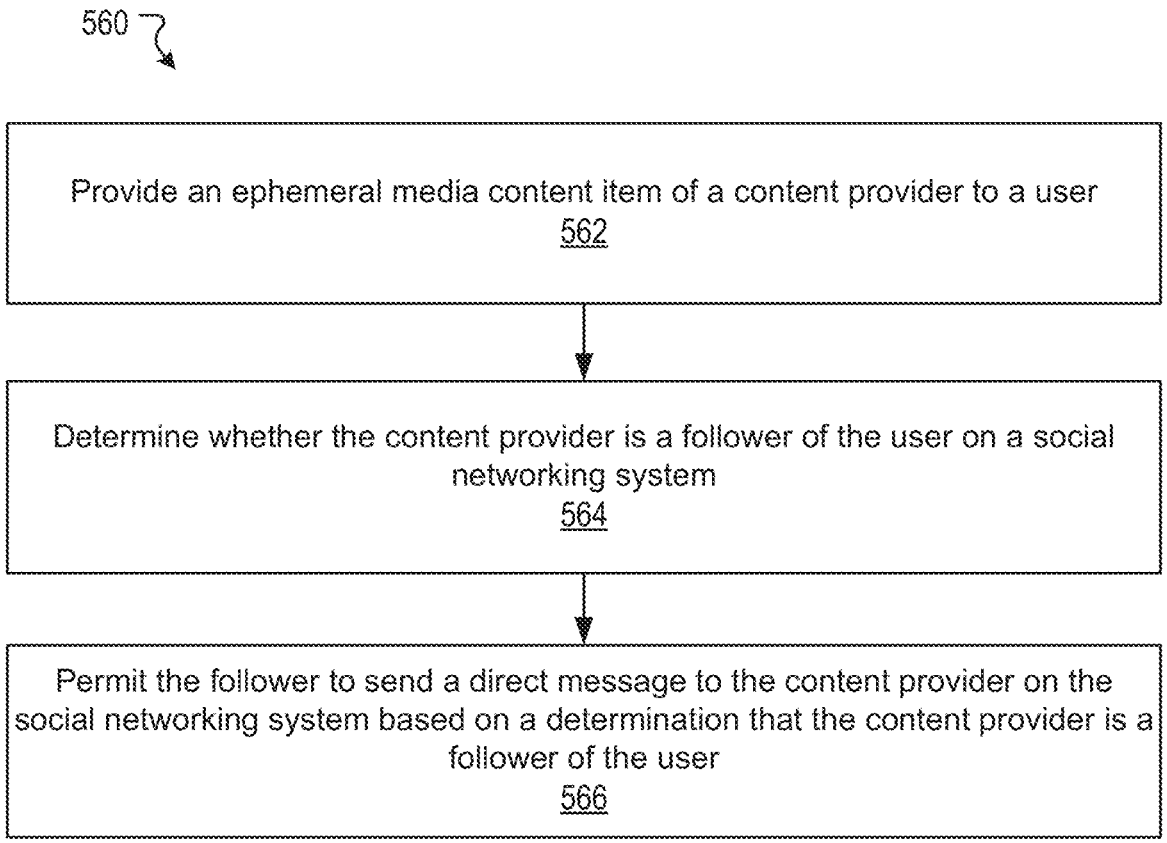
FIG. 5G illustrates an example method for controlling messaging, according to an embodiment of the present technology.

FIG. 5G illustrates an example method 560 for controlling messaging, according to an embodiment of the present technology. It should be appreciated that there can be additional, fewer, or alternative steps performed in similar or alternative orders, or in parallel, in accordance with the various embodiments and features discussed herein unless otherwise stated.

At block 562, the method 560 can provide an ephemeral media content item of a content provider to a user. At block 564, the method 560 can determine whether the content provider is a follower of the user on a social networking system. At block 566, the method 560 can permit the follower to send a direct message to the content provider on the social networking system based on a determination that the content provider is a follower of the user. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
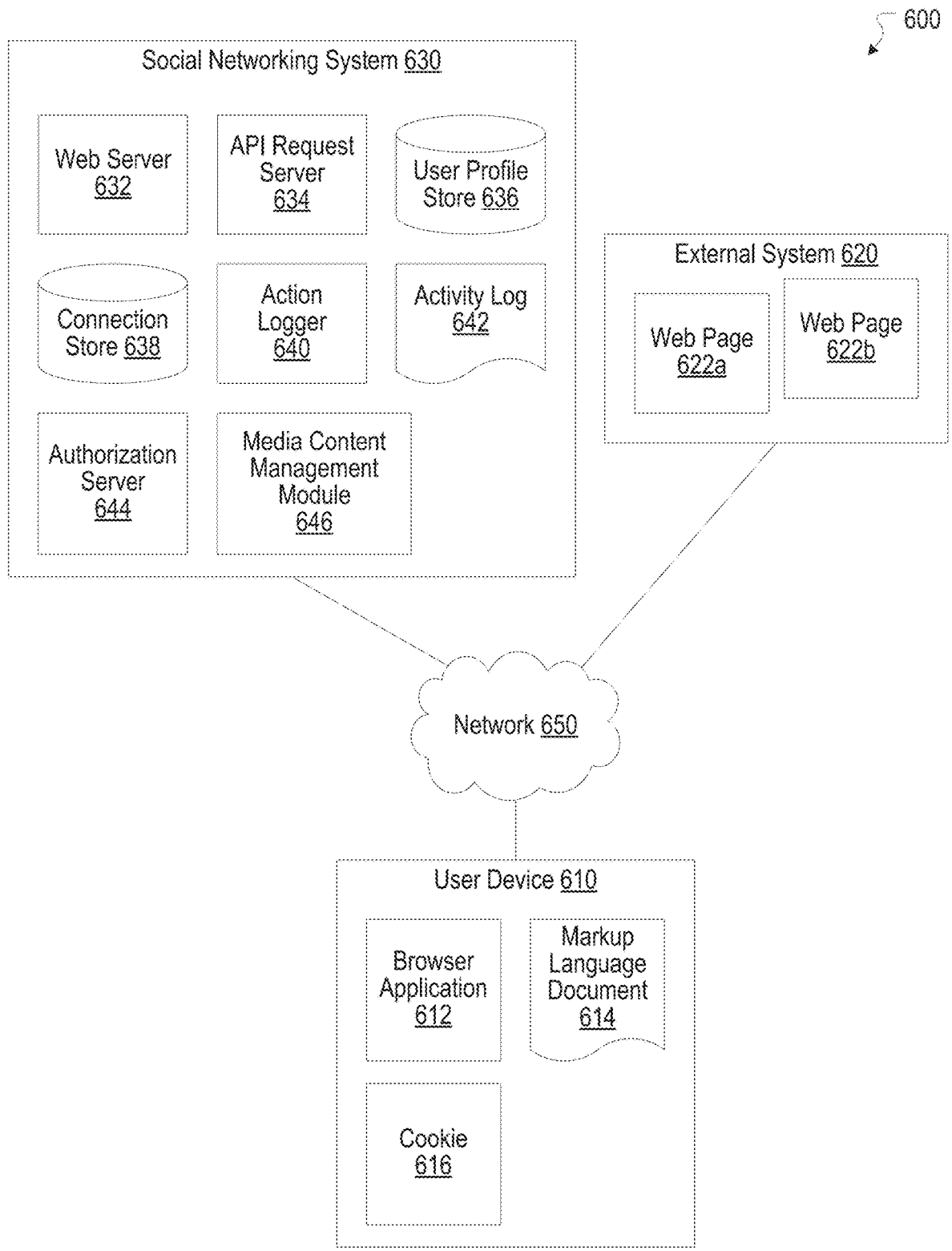
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a media content management module 646. The media content management module 646 can be implemented with the media content management module 102, as discussed in more detail herein. In some embodiments, one or more functionalities of the media content management module 646 can be implemented in the user device 610.

Hardware Implementation

Figure 7:
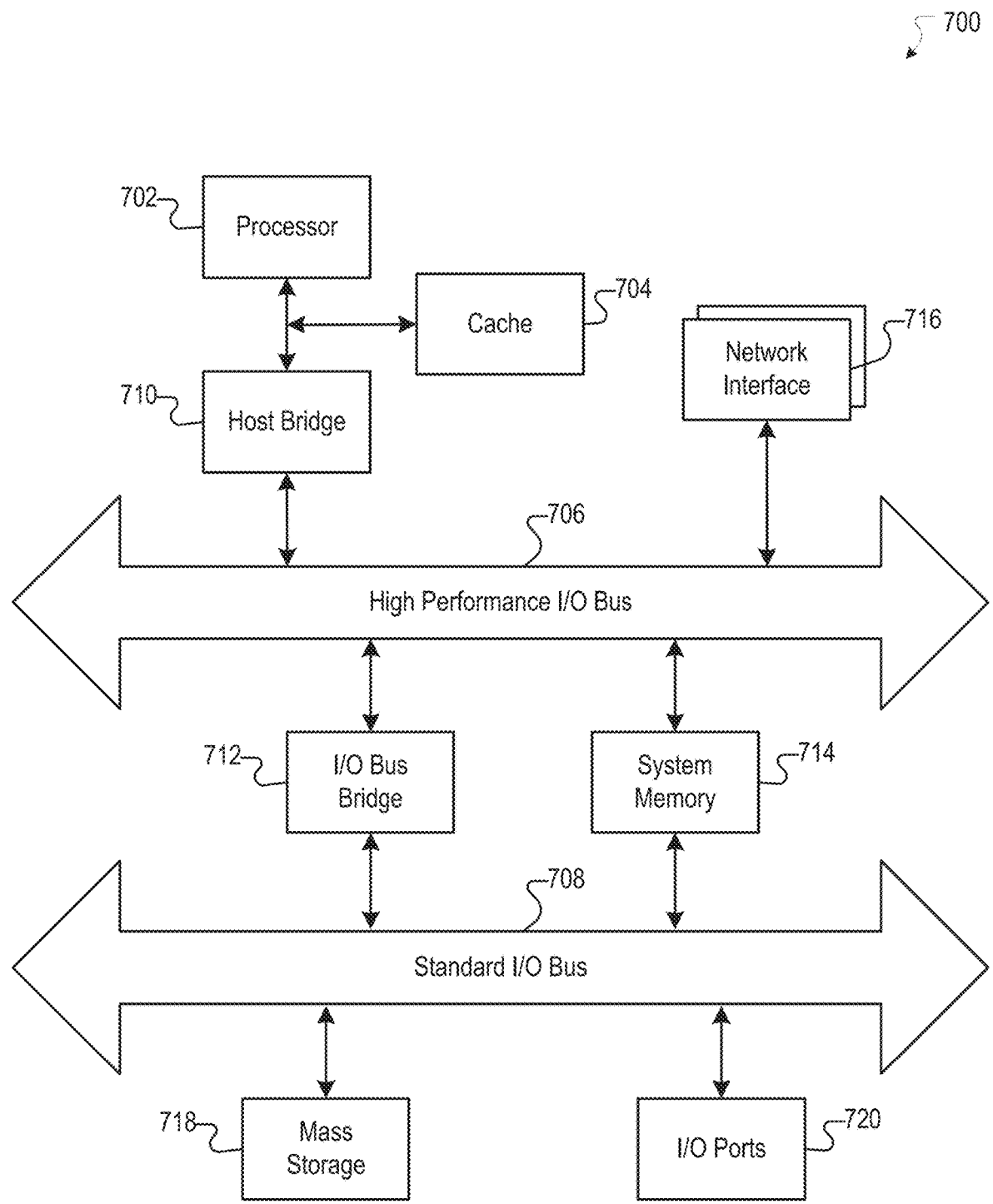
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    providing, by a computing system, a first element in an interface presentable to a user through which a plurality of ephemeral media content items are accessible by the user for a selected period of time, wherein the first element is a listing comprising identifiers of a plurality of content providers associated with the plurality of ephemeral media content items;
    providing, by the computing system, a second element in the interface through which a plurality of non-ephemeral media content items are accessible by the user, wherein the second element is a listing comprising the plurality of non-ephemeral media content items;
    receiving, by the computing system, a designation by a content provider that a media content item is a non-ephemeral media content item; and
    providing, by the computing system, the media content item for presentation in the second element in the interface based on the designation.

2. The computer-implemented method of claim 1, further comprising:
    receiving a designation by a content provider that a media content item is an ephemeral media content item; and
    providing an identifier of the content provider for potential presentation in the first element based on the designation.

3. The computer-implemented method of claim 1, wherein the first element is a first scrollable array comprising identifiers of a plurality of content providers associated with the plurality of ephemeral media content items and the second element is a second scrollable array comprising the plurality of non-ephemeral media content items.

4. The computer-implemented method of claim 1, wherein the first element and the second element are scrollable in different directions.

5. The computer-implemented method of claim 1, further comprising:
    indicating in the first element a type of one or more ephemeral media content items of the plurality of ephemeral media content items.

6. A system comprising:
    at least one processor; and
    a memory storing instructions that, when executed by the at least one processor, cause the system to perform:
    providing a first element in an interface presentable to a user through which a plurality of ephemeral media content items are accessible by the user for a selected period of time, wherein the first element is a listing comprising identifiers of a plurality of content providers associated with the plurality of ephemeral media content items; and
    providing a second element in the interface through which a plurality of non-ephemeral media content items are accessible by the user, wherein the second element is a listing comprising the plurality of non-ephemeral media content items;
    receiving a designation by a content provider that a media content item is a non-ephemeral media content item; and
    providing the media content item for presentation in the second element in the interface based on the designation.

7. The system of claim 6, further comprising:
    receiving a designation by a content provider that a media content item is an ephemeral media content item; and
    providing an identifier of the content provider for potential presentation in the first element based on the designation.

8. The system of claim 6, wherein the first element is a first scrollable array comprising identifiers of a plurality of content providers associated with the plurality of ephemeral media content items and the second element is a second scrollable array comprising the plurality of non-ephemeral media content items.

9. The system of claim 6, wherein the first element and the second element are scrollable in different directions.

10. The system of claim 6, further comprising:
indicating in the first element a type of one or more ephemeral media content items of the plurality of ephemeral media content items.

11. A non-transitory computer-readable storage medium including instructions that, when executed by at least one processor of a computing system, cause the computing system to perform a method comprising:
providing a first element in an interface presentable to a user through which a plurality of ephemeral media content items are accessible by the user for a selected period of time, wherein the first element is a listing comprising identifiers of a plurality of content providers associated with the plurality of ephemeral media content items; and
providing a second element in the interface through which a plurality of non-ephemeral media content items are accessible by the user, wherein the second element is a listing comprising the plurality of non-ephemeral media content items;
receiving a designation by a content provider that a media content item is a non-ephemeral media content item; and
providing the media content item for presentation in the second element in the interface based on the designation.

12. The non-transitory computer-readable storage medium of claim 11, wherein the first element is a first scrollable array comprising identifiers of a plurality of content providers associated with the plurality of ephemeral media content items and the second element is a second scrollable array comprising the plurality of non-ephemeral media content items.

13. The non-transitory computer-readable storage medium of claim 11, wherein the first element and the second element are scrollable in different directions.

14. The non-transitory computer-readable storage medium of claim 11, further comprising: receiving a designation by a content provider that a media content item is an ephemeral media content item; and providing an identifier of the content provider for potential presentation in the first element based on the designation.

* * * * *